United States Patent
Hailpern et al.

[11] Patent Number: 6,094,657
[45] Date of Patent: Jul. 25, 2000

[54] APPARATUS AND METHOD FOR DYNAMIC META-TAGGING OF COMPOUND DOCUMENTS

[75] Inventors: Brent Tzion Hailpern, Katonah; Peter Kenneth Malkin, Ardsley; Robert Jeffrey Schloss, Briarcliff Manor; Philip Shi-lung Yu, Chappaqua, all of N.Y.

[73] Assignee: International Business Machines Corporation, Armonk, N.Y.

[21] Appl. No.: 08/942,171

[22] Filed: Oct. 1, 1997

[51] Int. Cl.[7] .................................................. G06F 17/00
[52] U.S. Cl. .............................. 707/103; 707/6; 707/100
[58] Field of Search .................................. 707/1, 4, 103, 707/501, 515, 3, 6, 100; 380/4, 25; 235/492; 395/200.48

[56] References Cited

U.S. PATENT DOCUMENTS

| | | | |
|---|---|---|---|
| 5,664,208 | 9/1997 | Pavley et al. | 707/515 |
| 5,680,452 | 10/1997 | Shanton | 380/4 |
| 5,740,455 | 4/1998 | Pavley et al. | 707/515 |
| 5,748,954 | 5/1998 | Mauldin | 707/10 |
| 5,757,370 | 5/1998 | Amro et al. | 395/341 |
| 5,774,888 | 6/1998 | Light | 707/5 |
| 5,787,421 | 7/1998 | Nomiyama | 707/5 |
| 5,801,701 | 9/1998 | Koppolu et al. | 345/352 |
| 5,802,299 | 9/1998 | Logan et al. | 395/200.48 |
| 5,804,810 | 9/1998 | Woolley et al. | 235/492 |
| 5,826,261 | 10/1998 | Spencer | 707/5 |
| 5,838,906 | 11/1998 | Doyle et al. | 395/200.32 |
| 5,845,303 | 12/1998 | Templeman | 707/517 |
| 5,860,074 | 1/1999 | Rowe et al. | 707/526 |
| 5,864,870 | 1/1999 | Guck | 707/104 |
| 5,933,599 | 8/1999 | Nolan | 395/200.48 |
| 6,021,202 | 2/2000 | Anderson et al. | 380/25 |
| 6,026,388 | 2/2000 | Liddy et al. | 707/1 |

*Primary Examiner*—Wayne Amsbury
*Assistant Examiner*—Thuy Pardo
*Attorney, Agent, or Firm*—Ratner & Prestia

[57] ABSTRACT

A method and apparatus to dynamically maintain META-tag information specifying categorization and/or degree of compound documents, which are collections or hierarchy of collections of objects (possibly web pages), for efficient retrieval of leaf or intermediate objects with specific characteristics without the need to search any content of the collection. The specific characteristic and the contents of the collection can change constantly both qualitatively and quantitatively (including the insertion, deletion and update of objects). While dynamically maintaining the META-tag information, there are no inclusion restrictions on these compound documents, i.e., any collection can contain itself either directly or recursively; and all objects within a META-tagged compound document are not required to participate. The PICS protocol may be used to specify this META-tag information with both categorization and degree; to reflect the obsolescence, currency or freshness of an objects; to validate a given object using a digital signature; and to enable charging for the META-tag service. Aggregation methods are provided to enable maximization, minimization, and averaging; to limit the propagation of META-tags; and to handle the time-out of META-tag and information validity.

14 Claims, 22 Drawing Sheets

APPARATUS AND METHOD FOR DYNAMIC META-TAGGING OF COMPOUND DOCUMENTS

FIELD OF THE INVENTION

The present invention is related to an improved data processing system. A particular aspect of the present invention is related to a dynamic method of META-tagging compound documents whose contents change both quantitatively and qualitatively. A more particular aspect of the present invention is related to dynamic META-tagging of compound documents on the World Wide Web.

GLOSSARY OF TERMS

While dictionary meanings are also implied by certain terms used here, the following glossary of some terms may be useful.

Internet: The network of networks and gateways that use the TCP/IP suite of protocols.

Client: A client is a computer which issues commands to the server which performs the task associated with the command.

Server: Any computer that performs a task at the command of another computer is a server. A Web server typically supports one or more clients.

World Wide Web (WWW or Web): The Internet's application that lets users seeking information on the Internet switch connection from server to server and database to database by choosing ("clicking on") highlighted words or phrases of interest (known as hyperlinks). An Internet WWW server supports clients and provides information to the clients. The Web, which can be considered as the Internet with all of the resources addressed as URLs, uses HTML to display the information corresponding to URLs, and provides a point-and-click interface to other URLs.

Universal Resource Locator (URL): The URL is the method to uniquely identify or address information on the Internet, and may be considered a Web document version of an e-mail address. URLs may be cumbersome if they are associated with documents nested deeply within other documents. URLs may be accessed with a Hyperlink. An example of a URL identification is "http://www.philipyu.com:80/table.html". The URL has four components. Starting from the left of the example, the first component specifies the protocol to use (in this case http), separated from the rest of the locator by a ":". The next component is the hostname or IP address of the target host; this component is delimited by the double slash "//" on the left and on the right by a single slash "/" (or optionally a ":") The port number is an optional component, and is delimited on the left from the hostname by a ":" and on the right by a single slash "/". The fourth component is the actual file name or program name (in this example, table.html). In this example, the ".html" extension means that this is an HTML file.

HyperText Markup Language (HTML): HTML is a language used by Web servers to create and connect documents that are viewed by Web clients. HTML uses Hypertext documents.

Hypertext transfer protocol (HTTP): HTTP is an example of a stateless protocol, in which every request from a client to a server is treated independently. The server has no record of previous connections. At the beginning of a URL, "http:" indicates the requesting client and target server should communicate using the HTTP protocol regarding the specified resource.

Internet Browser or Web browser: A graphical interface tool that runs Internet protocols such as HTTP, and display results on the customers screen. The browser can act as an Internet tour guide, complete with pictorial desktops, directories and search tools used when a user "surfs" the Internet. In this application the Web browser is a client service which communicates with the World Wide Web.

Client cache: Client caches are typically used as a primary group (caches) of objects accessed by the client. In the WWW environment, client caches are typically implemented by web browsers and may cache objects accessed during a current invocation, i.e., a non persistent cache, or may cache objects across invocations.

Caching proxies: Specialized servers in a network which act as agents on the behalf of the client to locate an object, possibly returning a cached copy. Caching proxies typically serve as secondary or higher level caches, because they are invoked as a result of cache misses from client caches.

HTTP Daemon (HTTPD): A server having Hypertext Transfer Protocol and Common Gateway Interface capability. The HTTPD is typically supported by an access agent which provides the hardware connections to machines on the Internet and access to the Internet, such as TCP/IP couplings.

META-tagging: The association of information with a given object. For example, in HTTP, information can be associated with both requests and responses in the fields of the HTTP header. For example, an HTTP server can specify the URL from which a returned page was requested.

BACKGROUND OF THE INVENTION

The rapid increase in popularity of the World Wide Web (WWW or web) has led to a corresponding increase in the amount of data available to users. Due to this massive amount of information, many users suffer since it has become increasingly difficult to find information they want since there are so many choices. Further, it has become increasingly difficult to choose documents having groups of objects (compound documents) appropriate to particular audiences (e.g., elementary school children) who aren't yet ready to view or read certain types of material (e.g., violence). This is especially true for collections of electronic data, such as compound documents, whose contents frequently change, not just quantitatively, but qualitatively as well.

One example of such a compound document is an NNTP newsgroup. The content of such a compound document, the articles, changes daily, because new articles are added and older ones deleted. Although the articles for a given newsgroup should share a particular theme (e.g., alt.rec.guitar should provide discussions related to guitars, songs and guitar playing), a given topic or thread (such as a flame war) inappropriate or irrelevant to a given user might appear one day; last for a few days and then disappear. Therefore, a user cannot depend upon the titles of NNTP newsgroups during a search for information since the titles may be unresponsive to the actual contents of the newsgroups.

Another example of uncertainty of information within compound documents is a web site that provides a list of HTTP links to very new resources relevant to the web site (known as a "cool links" list; e.g., a list of links to neat new java applets from the java.sun.com page). As with the example above, a user cannot depend on the name or description of the cool link's web site in searching for data, since neither is responsive to the contents of the cool links collection.

Many users employ search tools (e.g., http://www.altavista.com) which return links to resources matching a user's query. For example, the query:

Query; Find text containing: "Java" AND "applications" AND "business"

returns an answer which is a list of data objects whose contents match the query. A problem encountered is only the immediate contents of data objects is checked during the query; the contents of any children of the data objects (either immediate or recursive) is not taken into account by the query. Thus, such search tools don't allow users to search for collections of data efficiently or accurately, only atomic data objects (i.e., objects without children).

Another method of information retrieval is that provided by yahoo, which is well known in the art and a description may be found, for example, at http://www.yahoo.com. With this method, an Internet service maps the compound documents of its information providing customers into a concept taxonomy. Information seekers can then navigate through the taxonomy to try and find the information they seek. Even though this method provides a useful device by which to navigate, it does not make provisions for compound documents whose contents change. A given compound document's location or locations in the taxonomy are determined when the compound document is added and can be changed only through manual intervention. Thus, this system is also unresponsive to compound document's whose contents change dynamically.

Thus, there is a need for dynamically providing labels to objects within compound documents, called dynamic META-tagging of compound documents, whose contents are not assumed static and which provides accurate META-tags at all levels of granularity (data object to collection).

SUMMARY OF THE INVENTION

An apparatus and method for categorizing a group of objects which together comprise an object set, wherein each object in the set includes a header in which a categorization value for that respective object is stored. The apparatus and method further include storage of a global rating value for all objects in the object set; and selective modification of the global rating value if at least one of a) the rating of any object in the object set is altered, b) at least one additional object is added to the object set, and c) at least one of the group of objects is deleted from the object set.

BRIEF DESCRIPTION OF THE DRAWINGS

These and other features and advantages of the present invention will become apparent from the following detailed description, taken in conjunction with the accompanying drawings, wherein.

DETAILED DESCRIPTION

Figure 1:
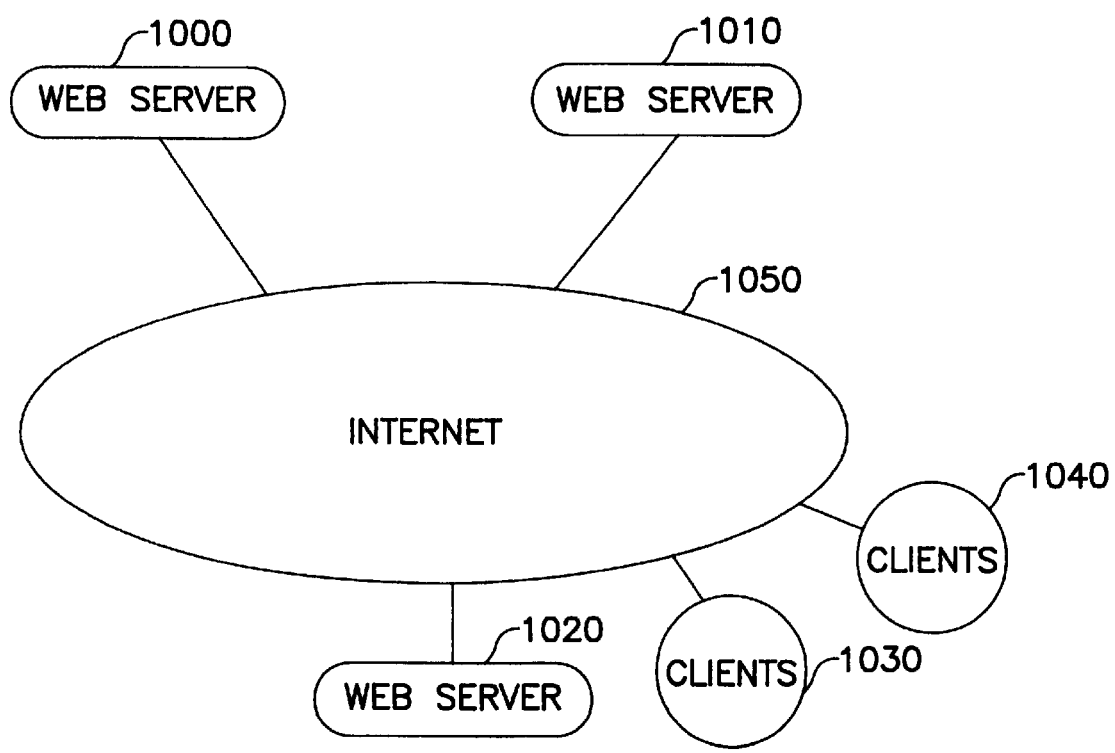
FIG. 1 is a diagram of a high-level architecture of a client-server hierarchy having features of the present invention.

FIG. 1 depicts an example of an overall architecture of servers and clients having features of one or more exemplary embodiments of the present invention. As shown, a web (http) client (1030 ... 1040) communicates with a web (http) server (1000 ... 1020) through the Internet (1050). By way of example only, assume the only one server (1020) implements the following described exemplary embodiments of the current invention, while the other servers (1000 ... 1010) act only as conventional web servers. Further, by way of example only, assume that the server (1020) has links within its web pages to other servers (1000 ... 1010). One skilled in the art will appreciate that a given server may have links to any number of other servers.

Note that FIG. 1 only conveys a logical connection diagram to represent the information flow of objects and requests; it does not represent a physical connection diagram. One skilled in the art will appreciate that the actual physical layout may include any number of network devices, and may contain subnets, routers, intranets and firewalls.

For the following description of a preferred embodiment of the present invention, the syntax and semantics of the conversations between the web servers 1000, 1010 and 1020 and clients 1030, 1040 is defined by the Hypertext Transfer Protocol, which is described in RFC 2068, R Fielding et al., "Hypertext Transfer Protocol—HTTP/1.1," filed January 1997; which may be found via URL: http://www.cis.ohio-state.edu/htbin/rfc/rfc2068.html, or refer to D. E. Comer, *Interworking with TCP/IP: Principles, Protocols, and Architecture,* Prentice Hall, Englewood Cliffs, N.J., 1988, for details on retrieving RFCs using electronic mail and FTP. Also, the protocol for communication is TCP/IP.

In overview of the communication establishment, a client (1040 ... 1050) first connects to the server's (1000 ... 1020) HTTP port. The client can then place a request, the general form of which is:

<request> <URL> <HTTP-Version> CRLF
<request header tag #1>: <request header value #1> CRLF
<request header tag #2>: <request header value #2> CRLF
<request header tag #3>: <request header value #3> CRLF
CRLF where, among others, <request> can be "HEAD," <HTTP-Version>, which specifies the version of HTTP, can be "HTTP/1.0," <request header tag> can be any string of non-whitespace characters, and <request header value #x> can be any string of characters. The specification for such a request are well known in the art and may be found in, for example, RFC 2068.

Note that any number of lines of the form:

<request header tag #x>: <request header value #x> CRLF can be included in any given request.

As defined in the HTTP protocol specification, in response to a request from a client, a server's reply has the following general form:

<HTTP-Version> <Status Code> <Comment> CRLF

<response header tag #1>: <response header value #1> CRLF

<response header tag #2>: <response header value #2> CRLF

CRLF

[Response data block]

where: <HTTP-Version> specifies the version of HTTP the client is running, <Status Code> indicates how well the server was able to fulfill the client's request, <Comment> is an optional entry consisting of a string which indicates the server's the reason for the returned status code, <response header tag #x> is a string of non-whitespace characters, <response header value #x> is a string of characters, and [Response data block] is a block of data. See RFC 2068 for details. Note that a server's response can contain any number of lines of the form:

<response header tag #x>: <response header value #x> CRLF in a given response.

For example, a client might connect to www.ibm.com and place the following request in order to determine how large the data block returned to the client will be:

HEAD/HTTP/1.1

Connection: close for which the request header; "Connection: close" indicates that the server can break the connection to the client after it has sent the requested data.

In response, www.ibm.com might respond:

HTTP/1.0 200 OK

Server: www.ibm.com

Date: Tuesday, May 6, 1997 19:05:16 GMT

Content-Type; text/html

Content-Length: 1767 indicating that the data block returned would be 1767 bytes long.

An aspect of the current invention is a method to specify particular information, which for the described embodiments employs placing information in the META element specified in the HTTP protocol, which may be called META-tags. In an exemplary Internet implementation, the Platform for Internet Content Selection (PICS) provides a specification for sending META-information concerning electronic content. PICS is a World Wide Web Consortium (W3C) Protocol Recommendation, and is described, for example, in Rating Services and Rating Systems (and Their Machine Readable Descriptions), version 1.1, W3C Recommendation Oct. 31, 1996, and in PICS Label Distribution Label Syntax and Communication Protocols, version 1.1, W3C Recommendation Oct. 31, 1996 (see also http://www.w3.org/PICS).

The recommendation defined within PICS may be employed as a method of sending values-based rating labels, such as "How much nudity is associated with this content," but the format and meaning of the META-information itself is fully general. For PICS, META-information about electronic content is grouped according to the "rating service" or producer-and-intended-usage of the information, and within one such group, any number of categories or dimensions of information may be transmitted.

Each category has a range of permitted values, and for a specific piece of content, a particular category may have a single value or multiple values. In addition, the META-information group, known as a "PICS label", may contain expiration information. The PICS recommendation includes permitting a PICS label to apply to more than one piece of electronic content. Each PICS label for a specific piece of electronic content may be added or removed from the content independently. HTTP has been augmented with request headers and response headers that support PICS. Many other technical bodies which define other common application protocols, such as NNTP, are now also considering adding PICS support.

Suppose, by way of example only, that the participating server's (1020) hostname is foo.bar.com, and that one of the image files it returns is image.gif, and that this file has a single PICS label whose "rating service" field indicates it contains values-based rating labels according to the Recreational Software Advisory Council (RSAC) rating system. As per the PICS protocol, this PICS label can be passed to clients requesting the image file by including it in the response's response header Such a response may have the following structure:

HTTP/1.1 200 OK

Server: foo.bar.com

Date: Tuesday, May 6, 1997 19:05:16 GMT

File-MIME-Type: image/gif

Content-Length: 1734

PICS-Label: (PICS-1.1 "http://www.rsac.org/ratingsv01.html"
label for "http://foo.bar.com/image.gif"
exp "1997.07.01T08:15-0500"
r (n 4 s 3 v 2 1 0))

where: RSAC's rating system can be retrieved from http://www.rsac.org/ratingsv01.html, r (n 4 s 3 v 2 1 0) is the rating field, 'n' 's' 'v' 'l' are transmit names for various META-information types; and the applicable values for this content are 4 (for n=nudity), 3 (for s=sex), 2 (for v=violence) and 0 (for l=language).

In the preferred implementation of the current invention, three types of META-tags are defined: 1) an External META-tag (EMT); 2) an Individual META-tag (IMT); and 3) an Aggregate META-tag (AMT).

The EMT is a conventional PICS label which describes a data object's (or document node's) immediate contents. This PICS label, either included in the node's HTTP or HTML header, or returned by a label bureau, is often (but not necessarily) created by an external rating service (e.g., RSAC). Those skilled in the art will appreciate that there may be several EMTs for a given data object, each defined by a different rating service.

The second type of META-tag, the IMT, is stored and maintained in a compound document database (2080) (described below in detail with reference to FIG. 4), and also only describes the node's immediate contents. The only necessary difference between the IMT and EMT is that the IMT is maintained in the compound document database (2080). Those skilled in the art will appreciate that a node's IMT can be the combination of several EMTs, in cases where a node has more that one.

The third type of META-tag is the AMT which is also stored and maintained in the compound document database (2080). This META-tag provides a description of a node which is the aggregation of the given node's IMT along with the AMTs of its immediate children. Thus, a node's AMT describes not only the contents of the given node, but the contents of all its children, direct and recursive, as well.

Note that for atomic data objects (i.e., those without any links to other objects), the EMT, IMT and AMT may be equivalent. For collection nodes (i.e., nodes containing links to other nodes), however, the AMT reflects not only the IMT, but the aggregated sum of all of the collection's children as well. So, for example, the AMT of a cool-links collection web page reflects both the IMT of the collection's web page and the AMTs of the linked web sites as well.

When an object, or document node, which includes META-tag information is manipulated, for example, by adding, deleting or changing a file, the object's EMT which is to be included in the META-tag aggregation provided by the current invention may also be updated. Whenever a document node is so manipulated, the compound document handler (2030) described below with reference to FIG. 5, must be appropriately invoked so that the necessary updates are made to the compound document database (2080). Consequently, requests to this handler include: 1) an Add request to add a link to a child node; 2) a Delete request to delete a link to a child node; and 3) an Update request to change a document node's IMT. The Add, Delete and Update request functions of the compound document handler (2030) are described below with references to FIGS. 6, 7, and 8 respectively.

Thus, for example, if a document node's EMT changes, the update request handler is called, which incorporates this change into the node's IMT and AMT, along with the AMTs of all of the node's parents (both immediate and recursive).

Figure 2:
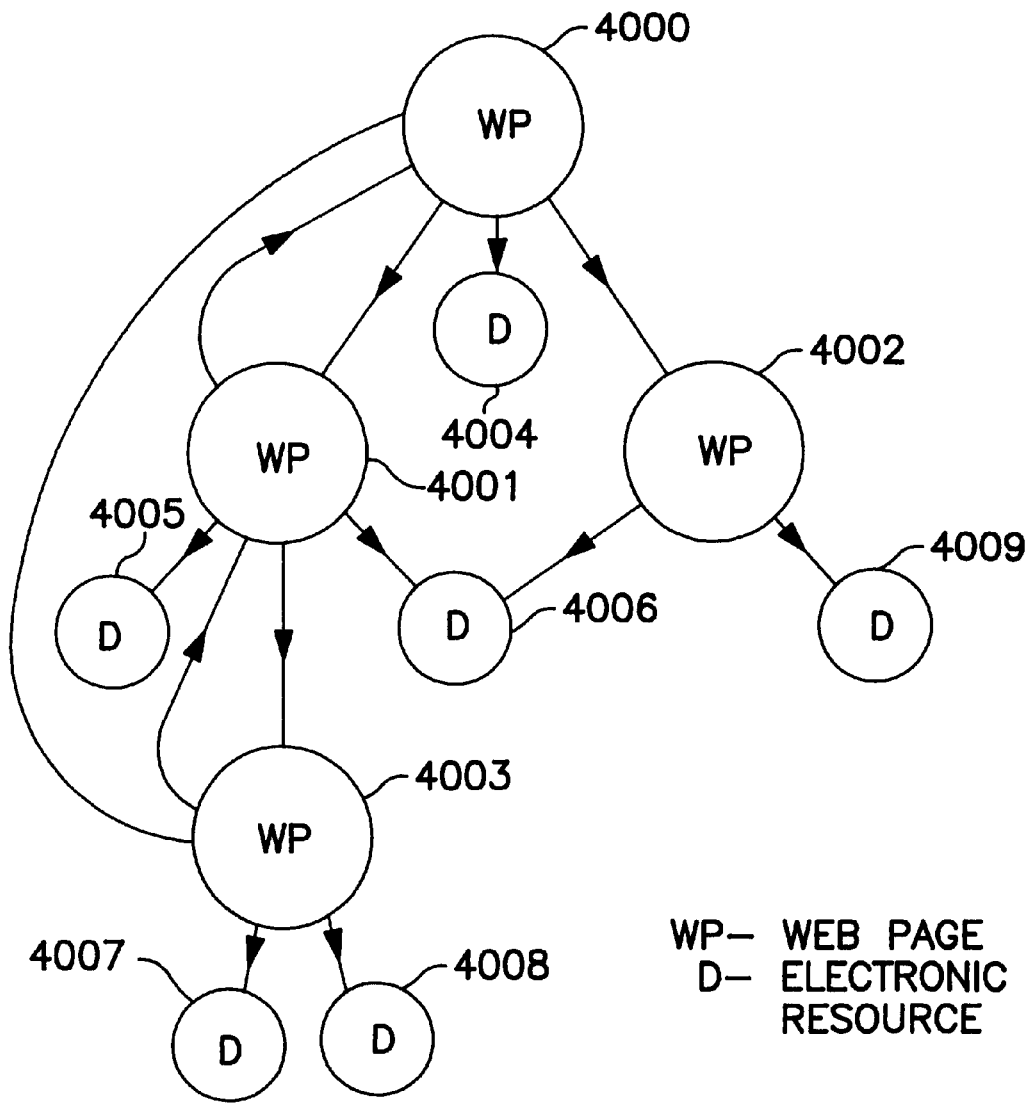
FIG. 2 illustrates an example of a compound document.

FIG. 2 depicts an example of a web site, which is an instance of a compound document for which the present invention may be employed. The data objects, or document nodes, of this web site are both web pages (i.e., data collections with 0 or more child nodes) and atomic data objects (i.e., data objects unable to have child nodes). The top data object of FIG. 2, or root node (4000) is web page which contains links to two web pages, 4001 and 4002; as well as a link to data object 4004. Child node 4001 contains links to data objects 4005 and 4006, and to web pages 4000 and 4003. Note that web page 4001 contains a link to 4000, its own parent, a common practice in the Internet's World Wide Web. Web page 4002 contains links to data objects 4006 and 4009. Note that both nodes 4001 and 4002 contain links to data object 4006. Node 4003 contains links to data objects 4007 and 4008; and to web pages 4001 (its parent) and 4000 (node 4001's parent). Note that not all nodes of a web site are required to participate in the META-tagging provided by the current invention.

Figure 4:
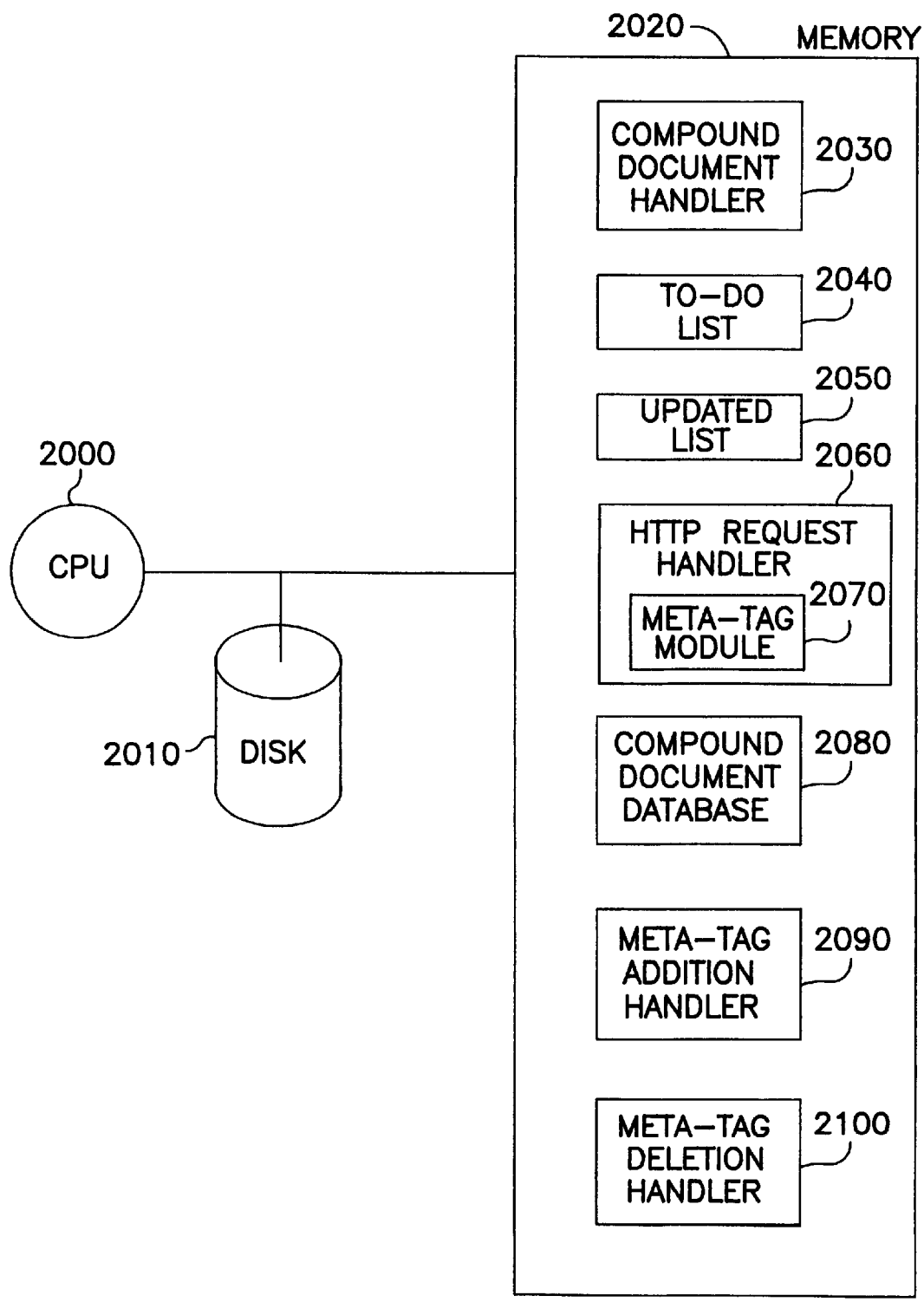
FIG. 4 depicts an example of the server of FIG. 1.

FIG. 4 depicts a more detailed example of the architecture of the server 1020 of FIG. 1. As is conventional, this server includes a CPU 2000, a disk 2010 such as a magnetic, electronic, or optical storage media for persistent data and/or program/code storage, and a memory 2020 for dynamic access and/or execution of the data and/or programs by the CPU 2000. Those skilled in the art will appreciate that within the spirit and scope of the present invention, one or more of the components located in the memory 2020 could be accessed and maintained directly via disk 2010, the network 1050, another server, or could be distributed across a plurality of servers.

Five components of this server 1020, preferably embodied as software executables on CPU 2000, are: 1) a compound document handler 2030; 2) an HTTP request handler 2060; 3) a compound document database 2080; 4) a META-tag addition handler 2090; and 5) a META-tag deletion handler 2100.

The compound document handler 2030, META-tag addition handler 2090, META-tag deletion handler 2100, and HTTP request handler 2060 will be described in more detail below with reference to FIGS. 4a, 5, 8a, 8b, and 9 respectively.

The memory 2020 also contains two other structures relevant to features of the present invention. As will be discussed in more detail with reference to FIGS. 5, 6, 7 and 8, a To Do list 2040 and Updated list 2050 are maintained within which the compound document handler's routines which can store and maintain lists of URLs for the processing steps of the document handler.

The compound document database 2080 provides for storage, update and retrieval of compound document nodes' information. Each node is identified by its URL, and the database cross references each URL with a list of the URLs of child nodes and a list of the URLs of parent nodes, as well as an individual META-tag (IMT) and an aggregated META-tag (AMT);

Therefore, referring to FIG. 2, for example, a request to the compound document database 2080 would return the URLs of nodes 4001 and 4002 in response to a request for the child nodes of node (4000).

Figure 4A:
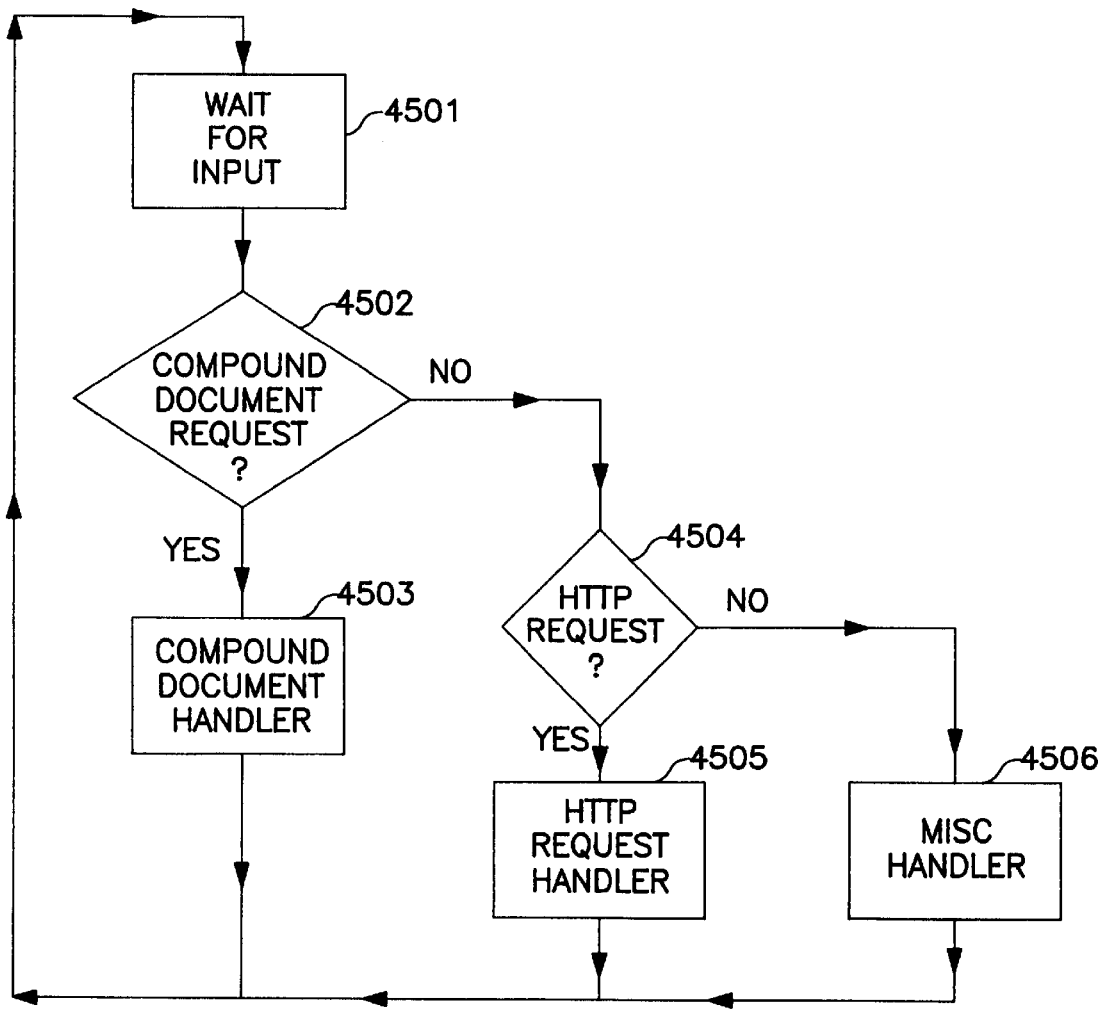
FIG. 4a depicts an example of the server logic.

FIG. 4a depicts an example of server logic having features of the present invention As depicted, in step 4501 the web server waits for an input request. In step 4502. if the input is a compound document modification request, the compound document handler 2030 is invoked at Step 4503. A detailed example of the compound document handler 2030 is described below with reference to FIG. 5. In step 4505, if the input received is an HTTP client request, the HTTP request handler 2060 is invoked in step 4505. Such requests include all conventional HTTP requests. A detailed example of the HTTP request handler 2060 is described below with reference to FIG. 9. In step 4504, for other types of inputs which are not the focus of the present invention (e.g., experimental HTTP requests) an appropriate miscellaneous handler 4506 may be invoked.

Figure 5:
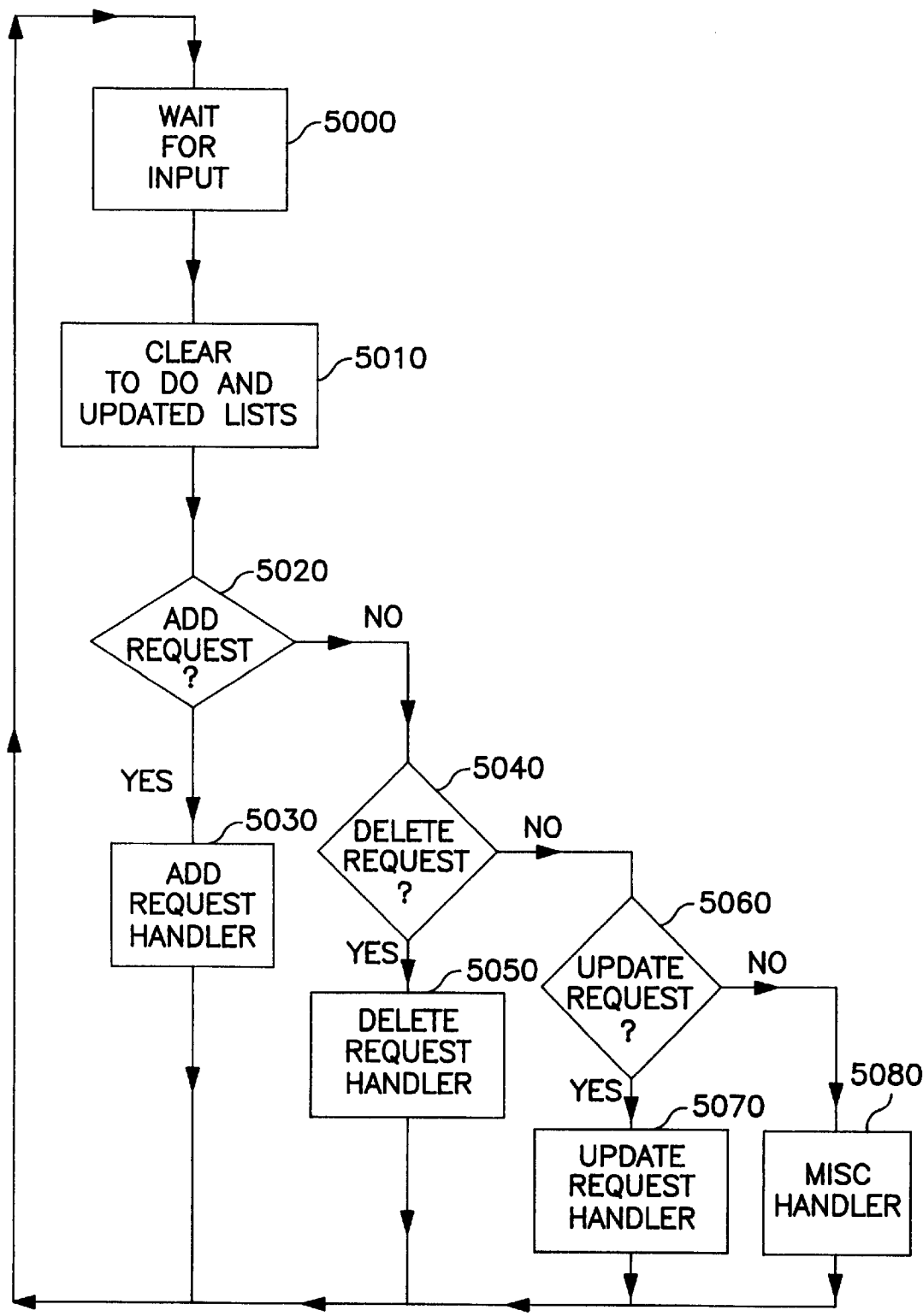
FIG. 5 depicts an example of the compound document handler.

FIG. 5 depicts an example of the compound document handler 2030. As previously mentioned, whenever an object, or document node, whose META-tag is to be included in the META-tag aggregation and maintenance provided by the current invention is manipulated, one of the compound document handler's request handlers must be invoked to update the compound document database 2080.

With reference to FIG. 5, the three request handlers are the Update request handler 5070, which allows the user to change the META-tag of one of the compound document's nodes; the Delete request handler 5050, which allows the user to delete a child node one of the compound document's nodes; and an Add request handler 5030, which allows the user to add a child node to one of the compound document's nodes.

Those skilled in the art will appreciate that requests to this compound document handler 2030 may be invoked automatically in situations where data objects were added and deleted automatically. An NNTP (news) server, for example, may be modified so that whenever a new article was added to a newsgroup, the add request handler (described below with reference to FIG. 5) would be invoked. Similarly, whenever a given article was deleted (e.g., due to timing out), the delete request handler (described below with reference to FIG. 7) would be invoked.

As FIG. 5 depicts, in step 5000, the compound document handler 2030 waits for input requests. In step 5010, after receiving such a request, the handler clears all entries from the To Do list 2040 and Updated list 2050. In step 5020, if the request is an add request, then the add request handler is invoked in step 5030. A detailed example of the add request handler is described with reference to FIG. 8. In step 5040, if the request is a delete request, then the delete request handler is invoked in step 5050. A detailed example of the add request handler is described with reference to FIG. 7. In step 5060, if the request is an update request, then the update request handler is invoked in step 5070. A detailed example of the add update handler is described with reference to FIG. 6. In step 5060, for other types of inputs which are not the focus of the present invention (e.g., a request that calculates how often nodes are deleted) an appropriate miscellaneous handler can be invoked in step 5080.

Figure 6A:
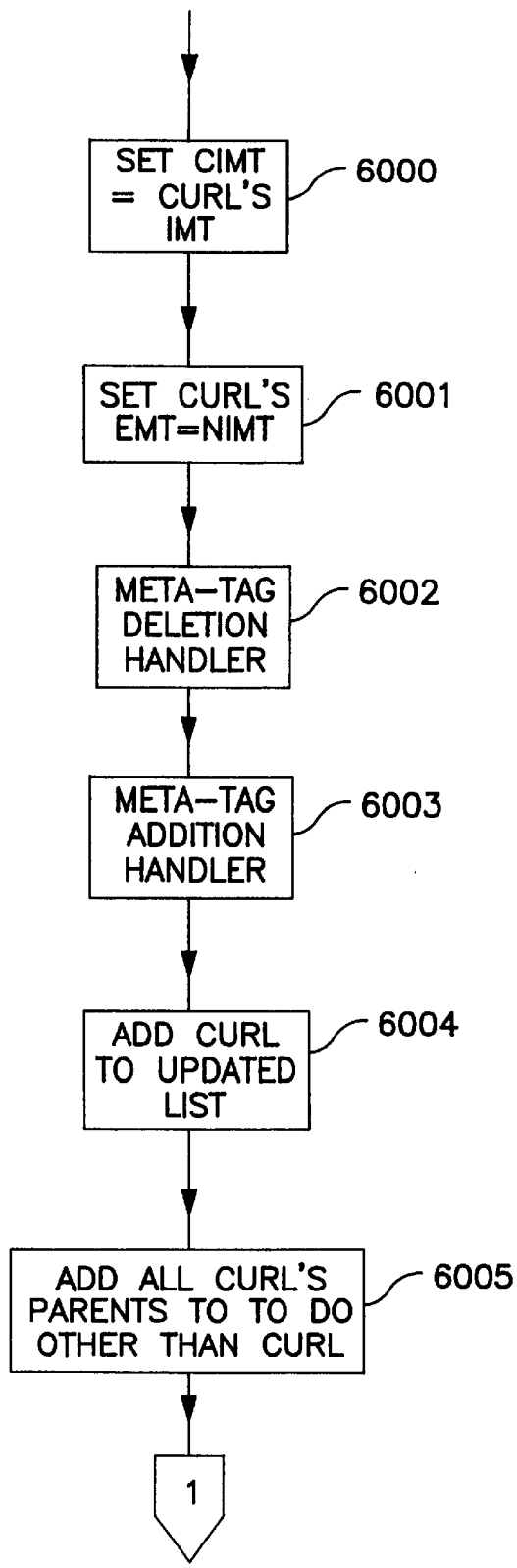
FIG. 6 depicts an example of the update request handler.
Figure 6B:
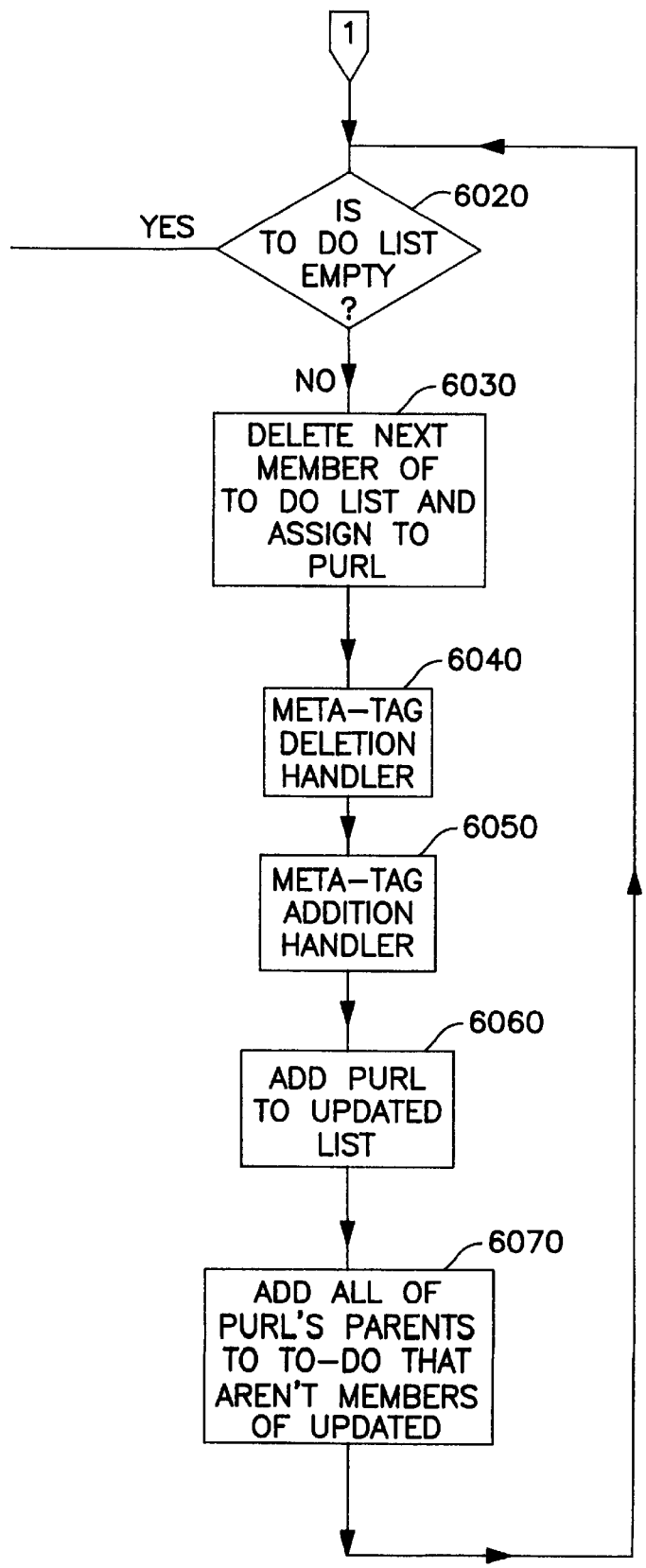

FIG. 6 depicts an example of the update request handler 5070, which enables the IMT of a node to be set or changed, and have this change reflected in all parent collections (both immediate and recursive). This capability enables an automatic agent, for example, to check the EMT of a particular set of nodes, and automatically update any objects whose EMT has changed. In this example, and in FIG. 6, CURL is a URL of the node whose AMT is to be changed; CIMT is the node's current IMT; NIMT is the node's new IMT; and PURL is a variable used to hold URL of parent node.

In 6000, CURL's IMT is retrieved from the compound document database 2080 and assigned to CIMT. In step 6002, CURL's IMT is set equal to NIMT in the compound document database 2080. In step 6002, the META-tag deletion request handlers invoked, being passed, CURL, and CIMT. A detailed example of the META-tag deletion request handler is given below with reference to FIG. 8b. This step eliminates the contribution of the CURL's old IMT from CURL's AMT. In step 6003, the META-tag addition request handler is invoked, being passed CURL and NIMT. A detailed example of the addition request handler is given below with reference to FIG. 8a. This step incorporates the CURL's new IMT into CURL's AMT. In step 6004, CURL is added to the Updated list 2050. In step 6005, the URL's of all of CURL's parents are retrieved from the compound document database 2080 and added to the To Do list 2040. In step 6020, the update request handler 5070 exits if the To Do list 2040 is empty (i.e., has no further entries).

If there are remaining members of the To Do list 2040, then, in step 6030, the next member, where "next" is determined by FIFO ordering, is assigned to PURL and deleted from the To Do list (2040). In step 6040, the META-tag deletion handler is invoked, being passed PURL and CIMT. This step eliminates the contribution of CURL's old IMT from PURL's AMT. A detailed example of the META-tag deletion handler is described below with reference to FIG. 10b. Then, in step 6050, the META-tag addition handler is invoked, being passed PURL and NIMT. This step incorporates the CURL's new IMT into PURL's AMT A detailed description of the META-tag addition handler is given below with reference to FIG. 8a. Next, in step 6060, PURL is added to the Updated list 2050. In Step 6070 the URL's of all of PURL's parent nodes are retrieved from the compound document database 2080, and all those that are not members of the Updated list 2050 are added to the To Do list 2040. The workflow then continues, starting at step 6020.

Figure 7:
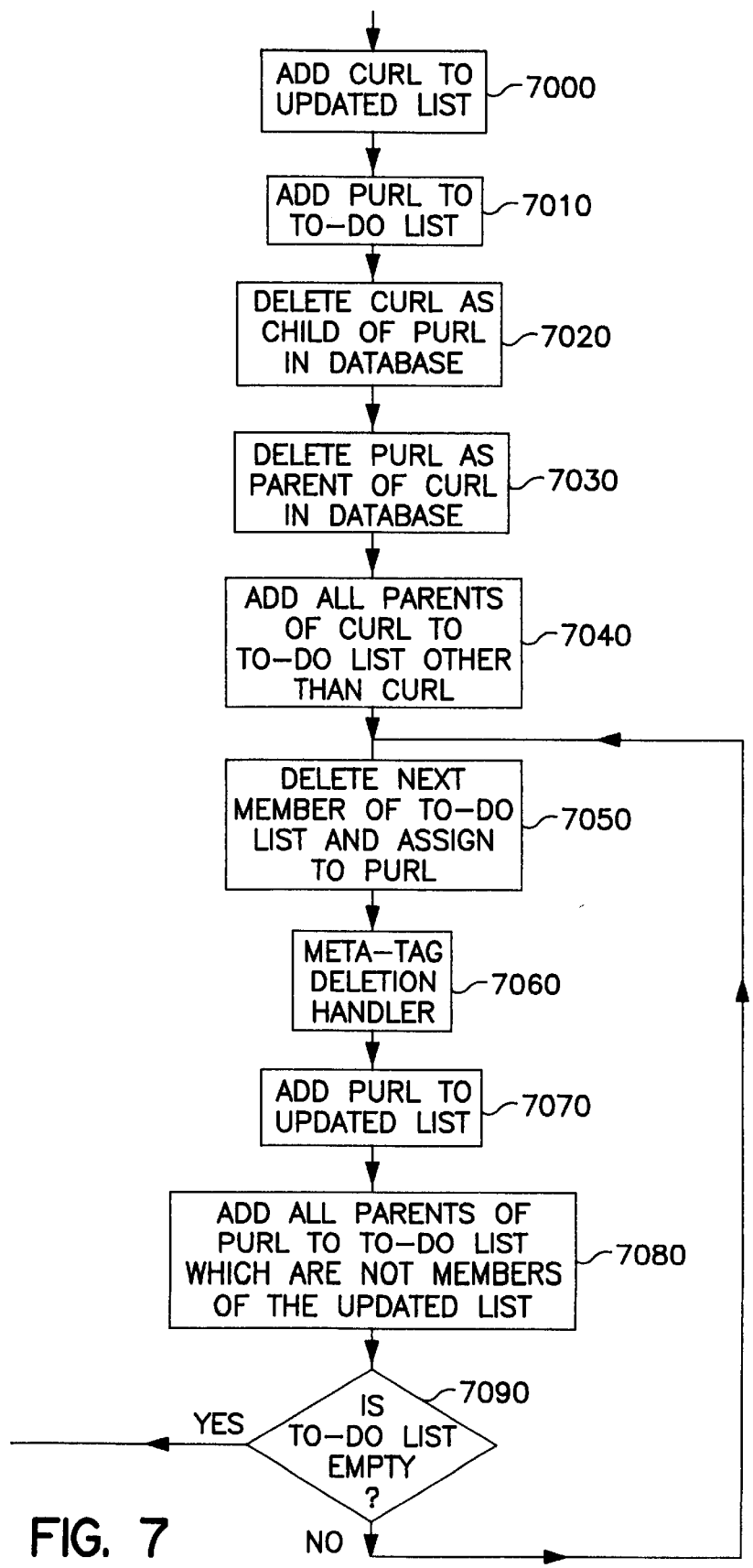
FIG. 7 depicts an example of the delete request handler.

FIG. 7 depicts an example of the delete request handler 5050 which allows compound document administrators, both human and automatic, to delete the specification of one node as the child of another node, and have this link deletion reflected in all parent object collections (both immediate and recursive). This capability enables an automatic agent, for example, to monitor the expiration date of a particular set of nodes, and then automatically delete any child object links that have expired. In this example, and in FIG. 7, CURL is a URL of the child node to be unlinked; CIMT is the child node's current IMT; and PURL is the URL of the parent node from which the child node is to be unlinked.

In step 7000, CURL is added to the Updated list 2050, and, in step 7010, PURL is added to the To Do list 2040. In step 7020, CURL is deleted as a child of PURL in the compound document database 2080, and, in step 7030, PURL is deleted as a parent of CURL in the compound document database 2080. In step 7040, the URLs of all of CURL's parents are retrieved from the compound document database 2080, and all those other than CURL are added to the To Do list 2040. In step 7050, the next, where "next" is determined by first-in, first-out (FIFO) ordering, is assigned to PURL and deleted from the To Do list 2040. In step 7060, the META-tag deletion handler is invoked, being passed PURL and CIMT. A detailed example of the META-tag deletion handler is described below with reference to FIG. 8b. Then, in step 7070, PURL is added to the Updated list 2050. In step 7080, all of PURL's parents are retrieved from the compound document database 2080, and all those URLs which are not members of the Updated list 2050 are added to the To Do list 2040. In step 7090, if the To Do list 2040 has no further entries, the delete request handler 5050 exits. Otherwise, the workflow then continues, starting at step 7050.

Figure 8:
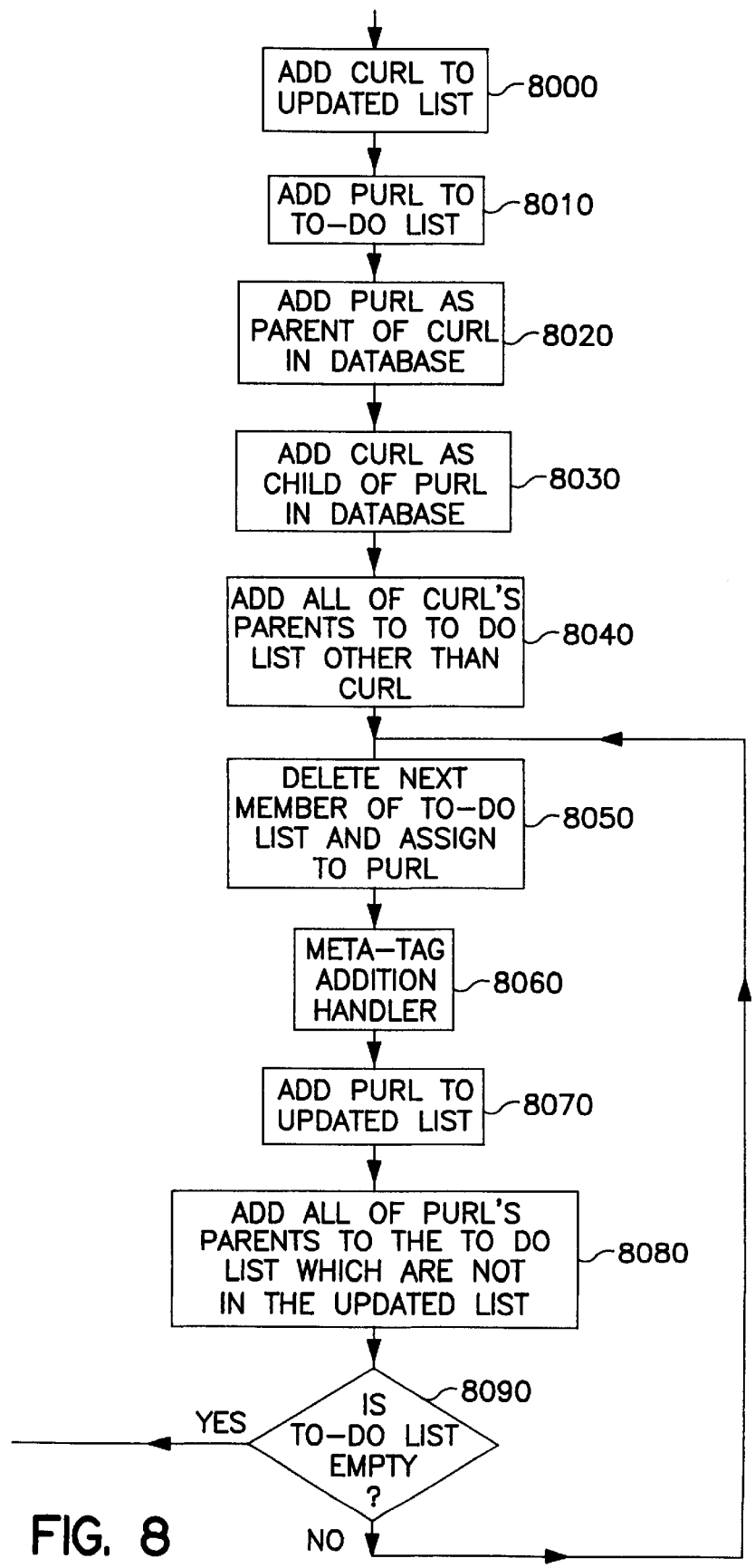
FIG. 8 depicts an example of the add request handler.

FIG. 8 depicts an example of the add request handler 5030 which allows compound document administrators, both human and automatic, to add the specification of one node as the child of another node, and have this link addition reflected in all parent collections (both immediate and recursive). In this example, and in FIG. 8, CURL is the URL of the child node to be linked; CIMT is the child node's current IMT; and PURL is the URL of the parent node to which the child node is to be linked.

In step 8000, CURL is added to the Updated list 2050, and, in step 8010, PURL is added to the To Do list 2040. In step 8020, PURL is added as a parent of PURL in the compound document database 2080, and, in step 8030, PURL is added as child node of CURL in the compound document database 2080. In step 8040, the URLs of all of CURL's parents are retrieved from the compound document database 2080, and all those other than CURL are added to the To Do list 2040. In step 8050, the next, where "next" is determined by FIFO ordering, is assigned to PURL and deleted from the To Do list 2040. In step 8060, the META-tag addition handler is invoked, being passed PURL and CIMT. A detailed examples of the META-tag addition handler is described below with reference to FIG. 8b. Then, in step 8070, PURL is added to the Updated list 2050. In step 8080, the URL's of all of PURL's parents are retrieved from the compound document database 2080, and all those which are not members of the Updated list 2050 are added to the To Do list 2040. In step 8090, if the To Do list 2040 has no further entries, the add request handler 5030 exits. Otherwise, the workflow then continues, starting at step 8050.

Figure 8A:
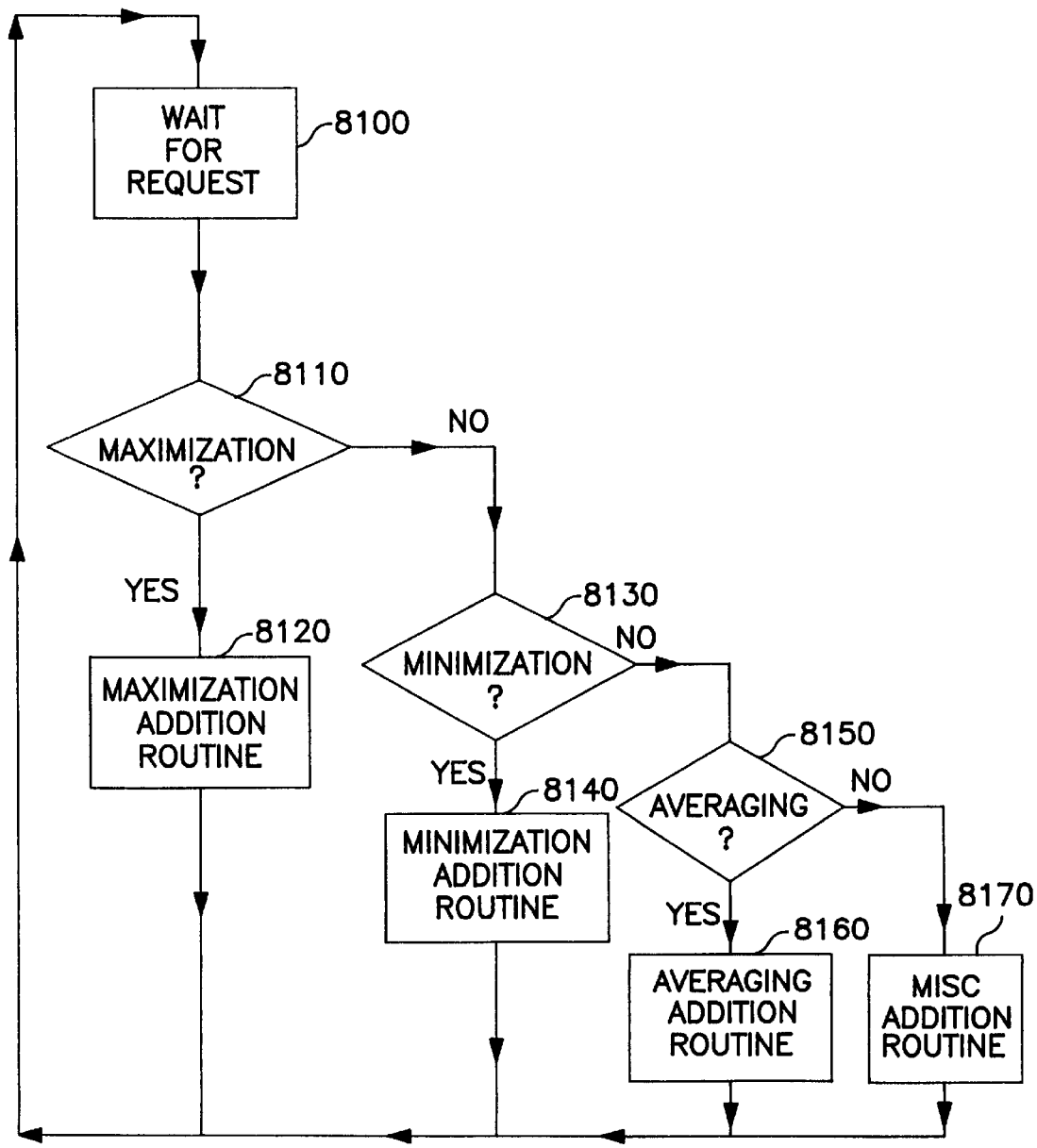
FIG. 8a depicts an example of META-tag addition handler.

FIG. 8a depicts an example of the META-tag addition handler 2090 having features of an exemplary embodiment of the present invention. In the preferred implementation, when called, the META-tag addition handler 2090 is passed a URL and a PICS label. Given these two parameters, the META-tag addition handler 2090 incorporates the given PICS label into specified URL's AMT using the appropriate aggregation function. Examples of the type of possible aggregation functions include: 1) Maximization, 2) Minimization, and Averaging.

Those skilled in the art will appreciate that in cases where the nodes' PICS labels (both IMT and AMT) have several PICS label categories, different aggregation functions may be used for each PICS label category. For example, if the PICS labels being used have PICS label categories for both obscenity and freshness, the META-tag-addition handler 2090 could aggregate the obscenity values using maximization (i.e., track the highest or worst value), while aggregating the freshness values using minimization (i.e., keep track of the least recent value). The exemplary embodiment depicted by FIG. 8a assumes that the PICS labels have only a single PICS label category. In cases where the PICS labels being used have more than one PICS label category, this addition handler 2090 can be invoked multiple times, once for each PICS label category.

Referring to FIG. 8a, in step 8100, the META-tag addition handler 2090 waits for requests. In step 8110, if the appropriate aggregation function is maximization, then the maximization addition routine is invoked in step 8120. Otherwise, in step 8130, if the appropriate aggregation method is minimization, then the minimization addition routine is invoked in step 8140. Otherwise, in step 8150, if the appropriate aggregation method is averaging, then the averaging addition routine is invoked in step 8160. Otherwise, for other aggregation functions that are not the focus of the present invention, a further miscellaneous aggregation routine may be invoked in step 8170. The Maximization, Minimization, and Averaging functions are now described.

For Maximization, given a new PICS label, the new AMT for the node corresponding to the specified URL can be determined by comparing the PICS label category value of the specified PICS label with that of the node's AMT, and then setting the node's new AMT value to the greater of the two.

For Minimization, given a new PICS label, the new AMT for the node corresponding to the specified URL can be determined by comparing the PICS label category values of the specified PICS label with that of the node's AMT, and then setting the node's new AMT value to the lesser of the two.

For Averaging, to determine the average aggregated value, weighted averages can be used. With this method, for a given PICS label category, a list of the values and the number of each value must be maintained in the compound document database 2080 for each participating node. Thus, for example, a given node's AMT for PICS label category "age" would also contain a field:

Contributing META-tags=( . . . ("age" 1×7, 2×8, 1×9) . . . )

indicating that the node's AMT for PICS label category "age" was the result of averaging one value of 7, two values of 8 and one value of 9, for example,:

(7+8+8+9)/14=32/4=8.

If a META-tag whose PICS label category for "age" with a value of 18 were added to this node, the resulting compound document database 2080 field for this node would become:

Contributing META-tags=( . . . ("age" 1×7, 2×8, 1×9, 1×18) . . . )

resulting in the node's AMT PICS category value for "age" equaling 10, i.e., (7+8+8+9+18)/5=50/5=10.

Figure 8B:
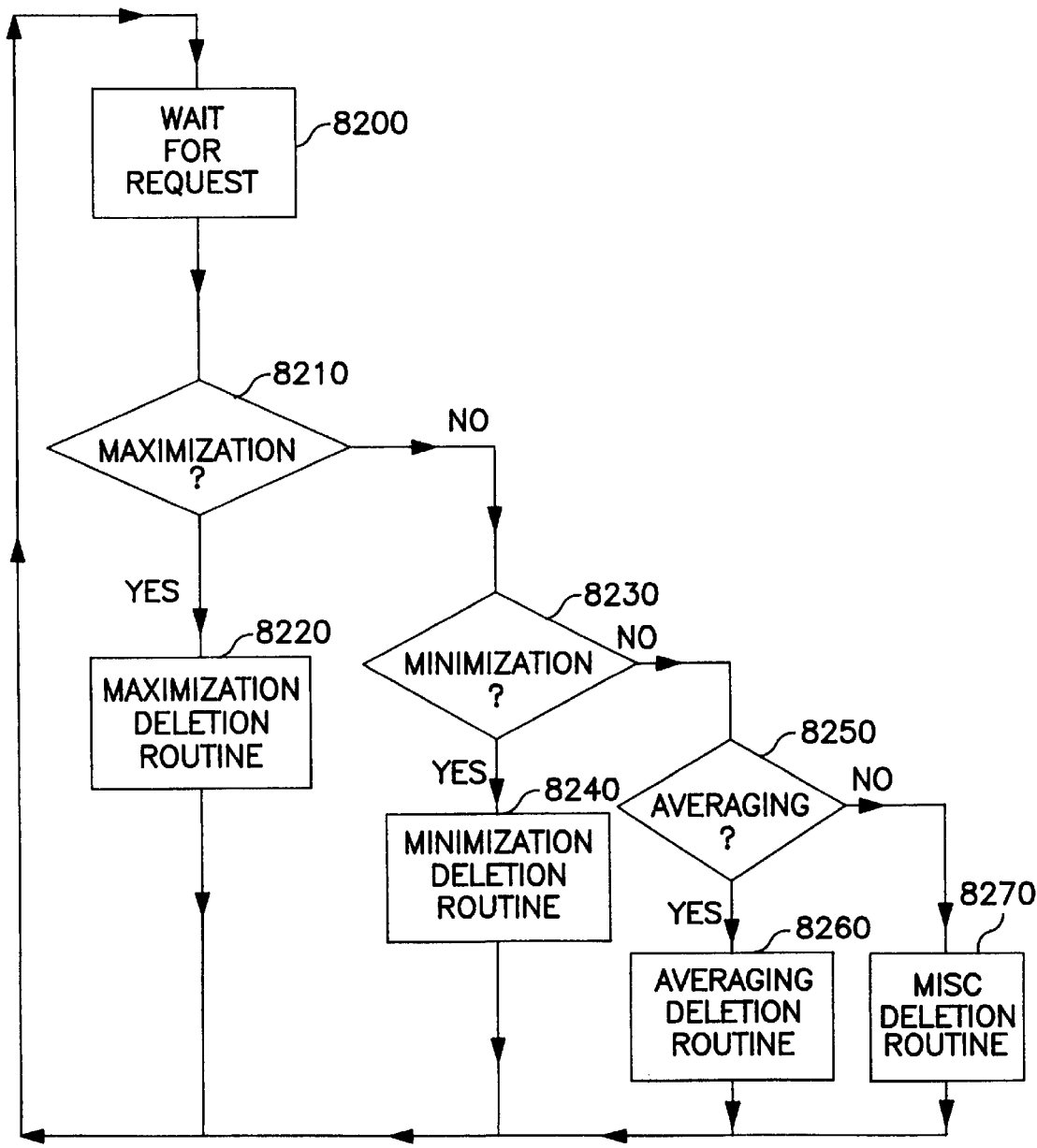
FIG. 8b depicts an example of META-tag deletion handler.

FIG. 8b depicts an example of the META-tag deletion handler 2100 having features of the exemplary embodiment of the present invention. In the preferred implementation, when called, the META-tag deletion handler 2100 is passed a URL and a PICS label. Given these two parameters, the META-tag deletion handler 2100 deletes the given PICS label from the specified URL's AMT using the appropriate aggregation function. As with the META-tag addition handler 2090, possible exemplary aggregation functions include Averaging, Maximization, and Minimization.

The maximization and minimization aggregation functions will be described below with reference to FIGS. 11 and 12 respectively.

As understood by those skilled in the art, in a situation where the nodes' PICS labels (both IMT and AMT) have several PICS label categories, different aggregation functions may be used for each PICS label category. For example, if the PICS labels being used have PICS label categories for both obscenity and freshness, the META-tag-deletion handler 2100 could aggregate the obscenity values using maximization (i.e., maintain the highest or worst value), while aggregating the freshness values using minimization (i.e., maintain the least recent value). The example depicted by FIG. 8b assumes that the PICS labels being used have only a single PICS label category. In cases where the PICS labels being used have more than one PICS label category, this META-tag deletion handler 2100 can be invoked multiple times, once for each PICS label category.

Referring to FIG. 8b, in Step 8200, the META-tag deletion handler 2100 waits for requests. In step 8210, if the appropriate aggregation function is maximization, then the maximization deletion routine is invoked in step 8220. Otherwise, in step 8230, if the appropriate aggregation method is minimization, then the minimization deletion routine is invoked in step 8240. Otherwise, in step 8250, if the appropriate aggregation method is averaging, then the averaging deletion routine is invoked in step 8260. Otherwise, for other aggregation functions that are not the focus of the present invention, a further miscellaneous aggregation routine may be invoked in step 8270.

For the Averaging method, to determine the average aggregated value, weighted averages can be used. With this method, for a given PICS label category, a list of the values and the number of each value must be maintained in the compound document database 2080 for each participating node. Thus, for example, a given node's AMT for PICS label category "age" would also contain a field:

Contributing META-tags= . . . ("age" 1×7, 2×8, 1×9, 1×18)) . . . )

indicating that the node's AMT for PICS label category "age" (equal to 10) was the result of averaging one value of 7, two values of 8 one value of 9, and one value of 18, for example, (7+8+8+9+18)/5=50/5=10.

If a META-tag whose PICS label category for age with a value of 18 were deleted from this node, the resulting compound document database 2080 field for this node would become:

Contributing META-tags= . . . (Age 1×7, 2×8, 1×9) . . . )

resulting in the node's AMT PICS category value for "age" equaling 8, i.e.:

(7+8+8+9)/4=32/4=8.

Figure 11A:
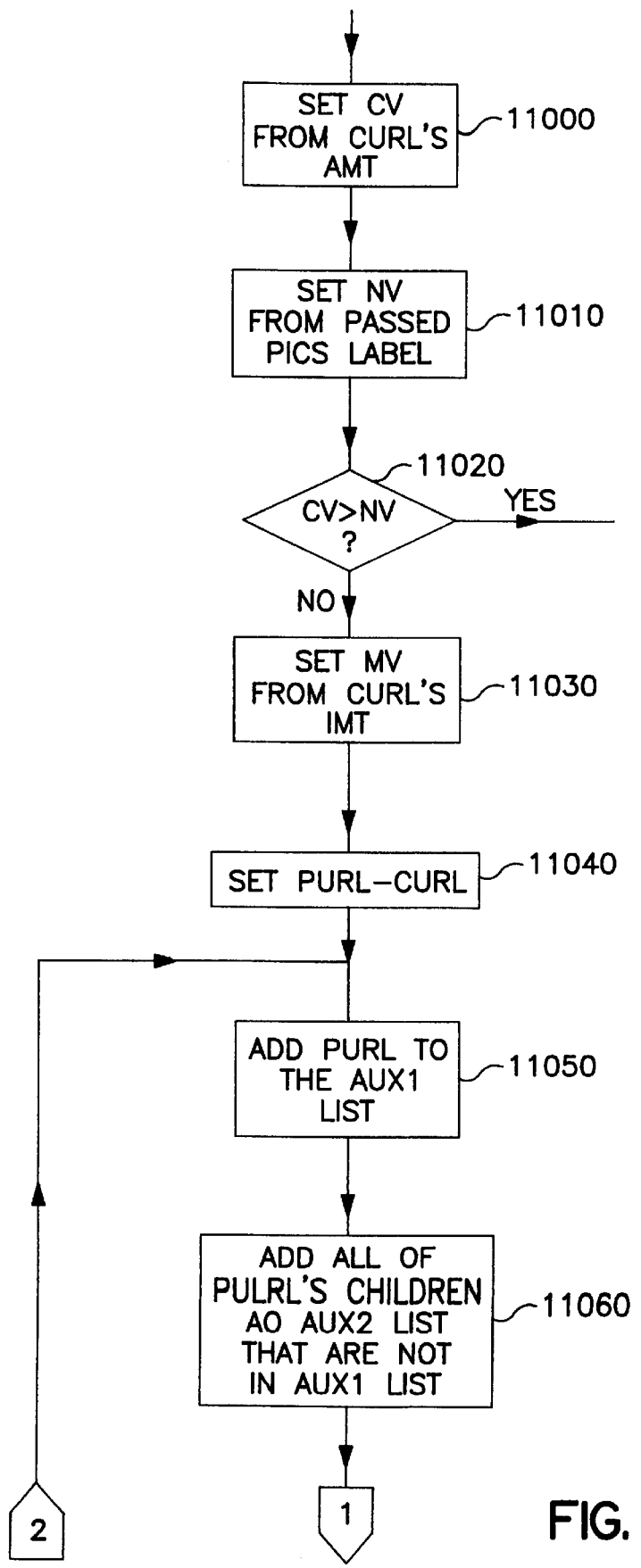
FIG. 11 depicts an example of a deletion routine for maximization aggregation.
Figure 11B:
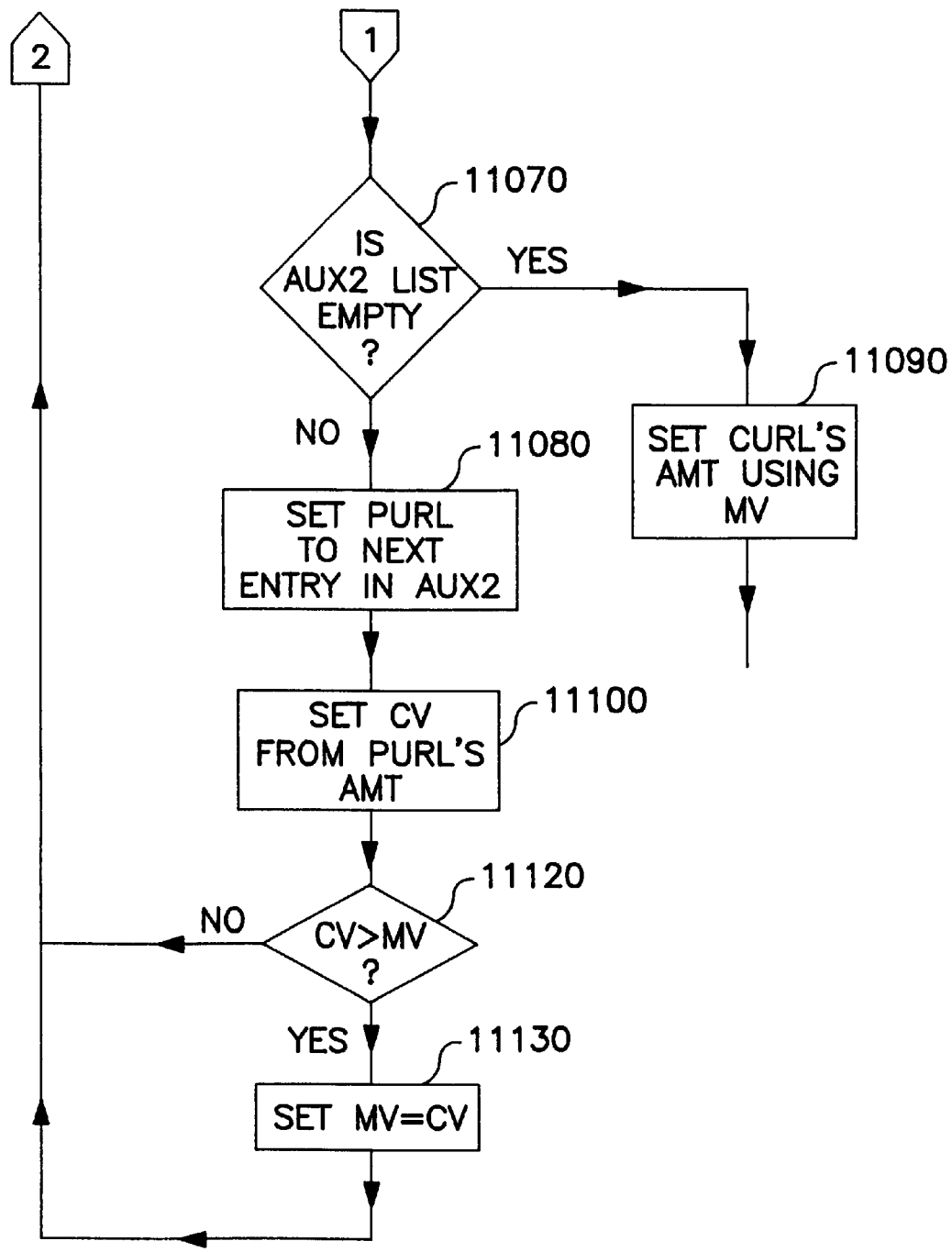

FIG. 11 depicts an example of how the AMT of the node specified by the passed URL can be updated given the deletion of a specified PICS label given that the AMT was computed using maximization. In this example, and in FIG. 11, CURL is the URL of a specified node; PURL is a variable used to hold a URL; NV is a PICS label category value of the specified META-tag; CV is a PICS label category value for a specified node's AMT; MV is a variable used to hold new maximum value; aux1 is a list used to hold URLs of nodes already checked; and aux2 is a list used to hold URLs of nodes that need to be checked.

Note that in this example, two temporary buffers, or lists, aux1 and aux2, are used to keep track of URL's for processing purposes only. In the preferred implementation, these lists may be resident in memory.

Referring to FIG. 11, in Step 11000, CV is set equal to the PICS label category value from CURL's AMT (CURL's AMT having been retrieved from the compound document database 2080). In step 11010, NV is set equal to the PICS label category value from the specified PICS label. In step 11020, if CV is greater than NV (i.e., NV is not the maximum), then the routine exits, since no modification of the compound document database 2080 is required. If CV is not greater than NV, then in step 11030, MV is set equal to the PICS label category value from CURL's IMT (CURL's IMT having been retrieved from the compound document database 2080). MV is initialized in this way to take into account CURL's own contribution to its AMT. In step 11040 PURL is set equal to CURL. In step 11050, PURL is added to the aux1 list. In step 11060, all of PURL's immediate child nodes (whose URLs are retrieved from the compound document database 2080) that are not members of the aux1 list are added to the aux2 list. In step 11070, if the aux2 list is empty, then in step 11090, the PICS label category value of CURL's AMT is set equal to MV; and then the routine exits. Otherwise, if there are remaining members in the aux2 list, then, in Step 11080, the next member of the aux2 list, where "next" is determined by FIFO ordering, is assigned to PURL, and then deleted from the aux2 list. In Step 11100, CV is set equal to the PICS label category value of PURL's AMT. Then, in step 11120, if CV is not greater than MV, the routine's workflow continues at step 11050. Otherwise, in step 11130, MV is set equal to CV, the new maximum value, and then the routine's workflow continues at step 11050.

So, by way of example, looking at FIG. 2, suppose that the PICS labels involved have only a single PICS label category: "technical" and that the relevant nodes' URLs and PICS label category values are as follows:

Node 4002: URL=http://st1.bar.com/foo.html, AMT=3, IMT=0;

Node 4006: URL=http://st1.bar.com/pic.jpg.html, AMT=1;

Node 4009: URL=http://st1.bar.com/abs.txt, AMT=2.

For example, if a PICS label with a "technical" PICS label category value of 3 were deleted from node 4002, because the deleted value equals the current maximum, the routine must determine a new maximum by checking all contributors. Specifically, the IMT value of 4002 and the AMT value of 4006 and 4009 (node 4002's child nodes). Since these values are 0, 1 and 2 respectively, and since 2 is the maximum of the three, node 4002's new AMT PICS label category values for "technical" will get reset to 2.

Figure 12A:
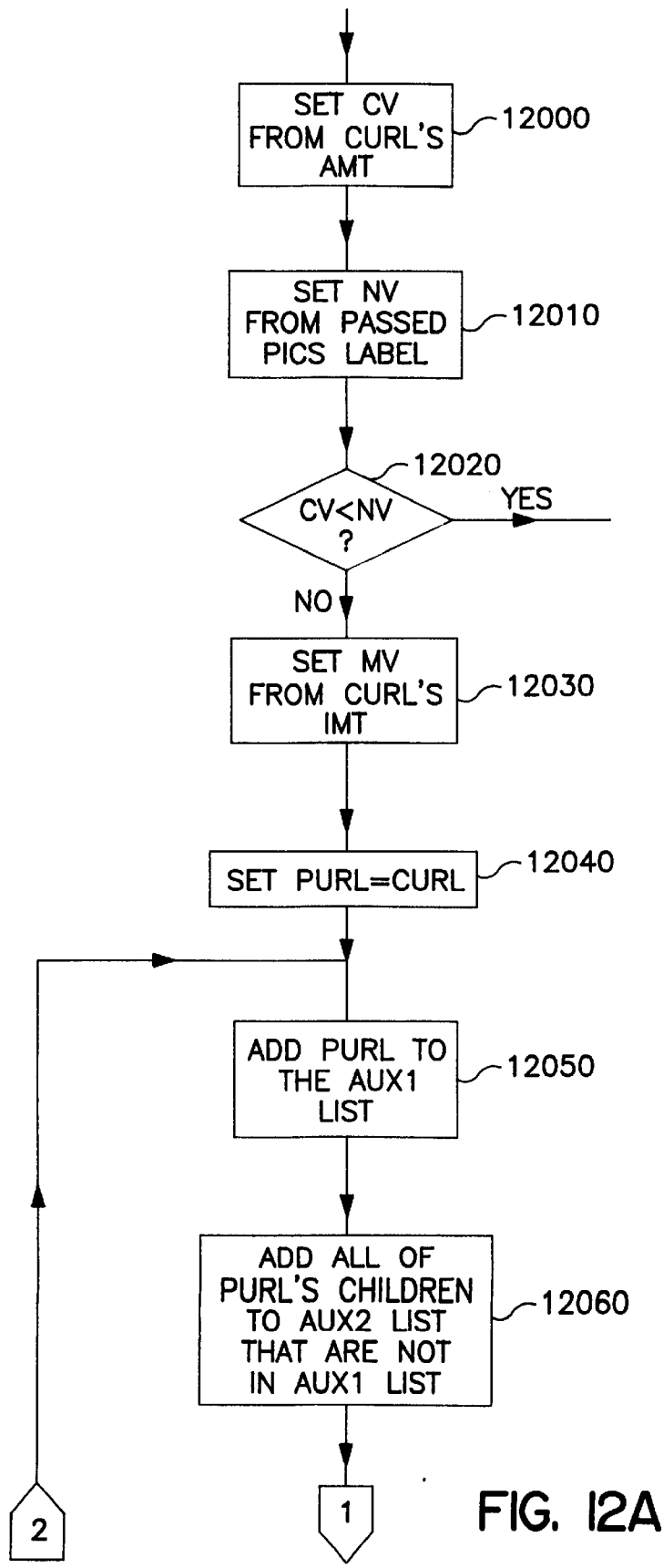
FIG. 12 depicts an example of a deletion routine for minimization aggregation.
Figure 12B:
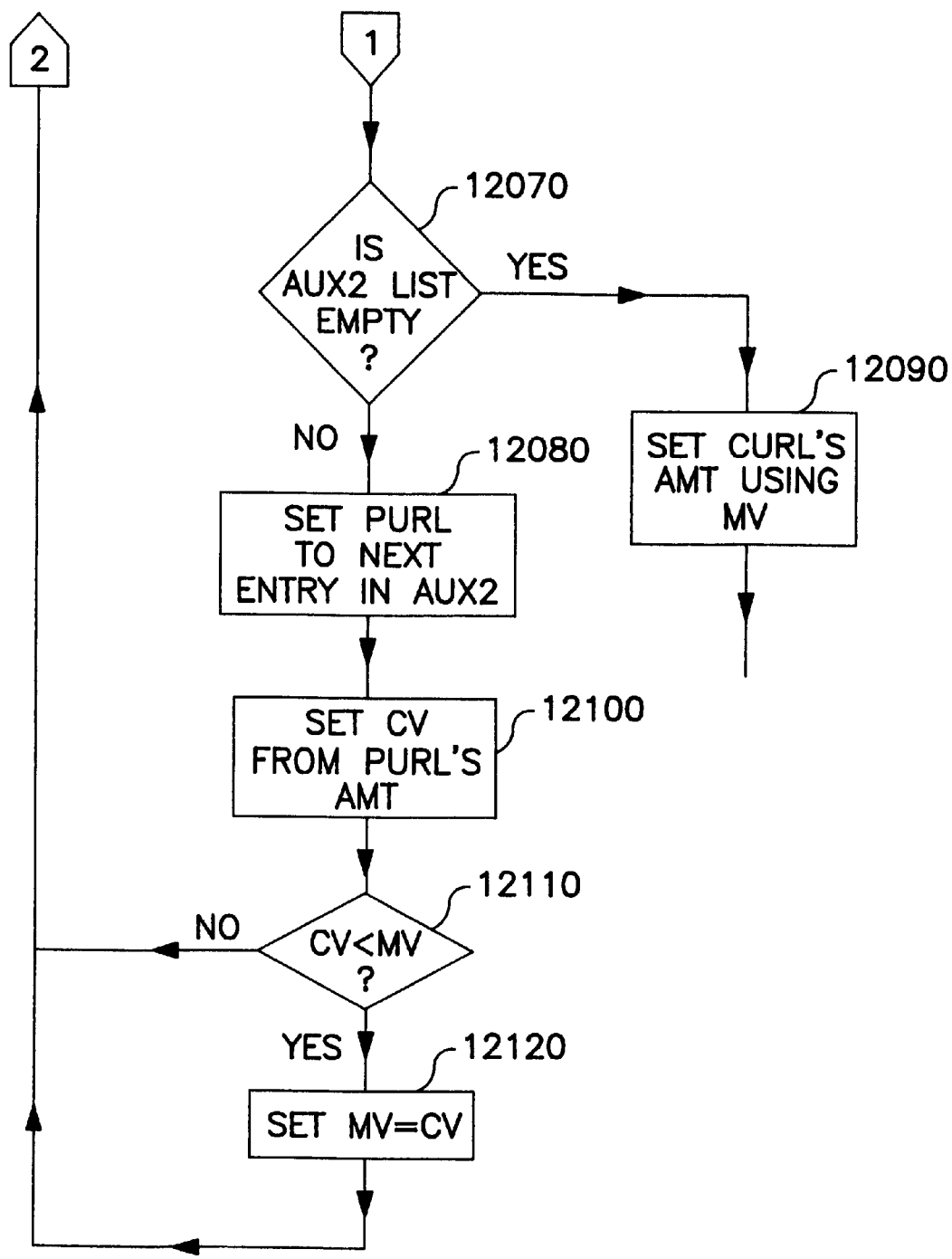

FIG. 12 depicts an example of how the AMT of the node specified by the passed URL can be updated given the deletion of a specified PICS label given that the AMT was computed using minimization. In this example, and in FIG. 12, CURL is a URL of specified node; PURL is a variable used to hold a URL; NV is a PICS label category value of the specified META-tag; CV is a PICS label category value for a specified node's AMT; MV is a variable used to hold new minimum value; aux1 is a list used to hold URLs of nodes already checked; and aux2 is a list used to hold URLs of nodes that need to be checked.

For this exemplary embodiment of minimization, two temporary buffers (lists), aux1 and aux2, are used to keep track of URL's for processing purposes only. In the preferred implementation, these lists may be resident in memory.

Referring to FIG. 12, in step 12000, CV is set equal to the PICS label category value from CURL's AMT (CURL's AMT having been retrieved from the compound document database 2080). In step 12010, NV is set equal to the PICS label category value from the specified PICS label. In step 12020, if CV is less than NV (i.e., NV is not the minimum), then the routine exits, since no modification of the compound document database 2080 is required. If CV is not less than NV, then in Step 12030, MV is set equal to the PICS label category value from CURL's IMT (CURL's IMT having been retrieved from the compound document database 2080). MV is initialized in this way to take into account CURL's own contribution to its AMT. In step 12040 PURL is set equal to CURL. In step 12050, PURL is added to the aux1 list. In step 12060, all of PURL's immediate child nodes (whose URLs are retrieved from the compound document database 2080) that are not members of the aux1 list are added to the aux2 list. In step 12070, if the aux2 list is empty, then in step 12090, the PICS label category value of CURL's AMT is set equal to MV; and then the routine exits. Otherwise, if there are remaining members in the aux2 list, then, in step 12080, the next member of the aux2 list, where "next" is determined by FIFO ordering, is assigned to PURL, and then deleted from the aux2 list. In step 12100, CV is set equal to the PICS label category value of PURL's AMT. Then, in step 12110, if CV is not less than MV, the routine's workflow continues at step 12050. Otherwise, in step 12120, MV is set equal to CV, the new minimum value, and then the routine's workflow continues at step 12050.

Those skilled in the art will appreciate that the methods described above for both addition and deletion do not preclude nodes of a given compound document from having multiple PICS label categories in their labels because each method described can be run separately. For example, suppose that a given compound document uses META-tags with two PICS label categories: "age" and "obscenity," and that META-tags were aggregated using maximization. If a given META-tag were deleted from a particular node, then the maximization aggregation META-tag deletion handler would first be run on the "age" PICS label category and then on the "obscenity."

Those skilled in the art will also appreciate that since the different type of aggregation addition and deletion handlers can be applied separately, that different aggregation functions can be applied to different PICS label categories. For example, a given document's PICS category label value for "obscenity" might be maximized, while the PICS category label value for "age" is minimized.

Figure 9:
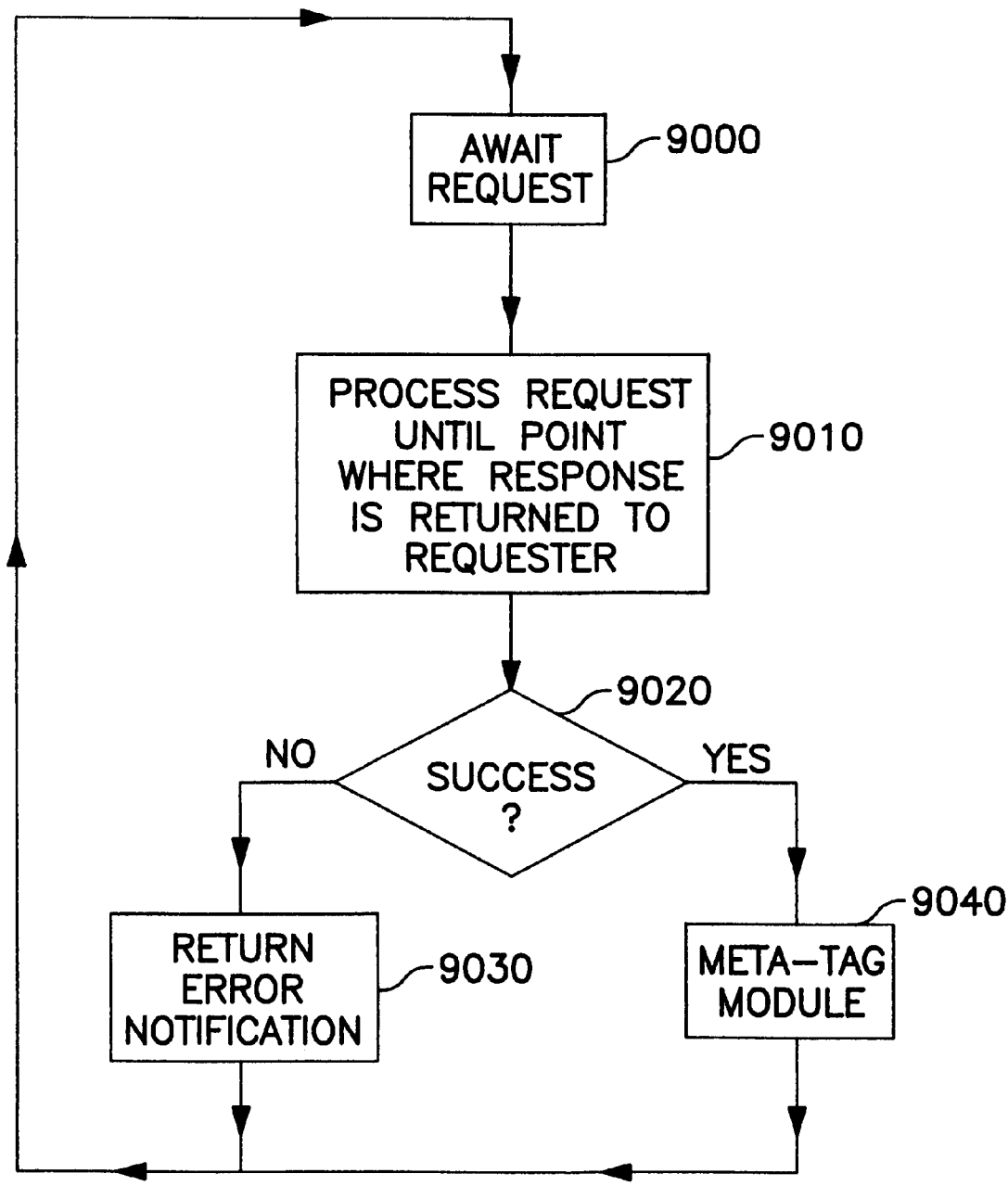
FIG. 9 depicts an example of the HTTP request handler.

FIG. 9 depicts an example of the workflow of the HTTP request handler 2060, which is a conventional HTTP web server augmented by a META-tag module 2070. The META-tag module 2070 is described subsequently with reference to FIG. 10. An HTTP server's behavior may be augmented by adding modules to which control is temporarily passed. These modules are written using an application programmer's's interface (API) which may be, for example, ICAPI, which is included in the Internet Connection Server (ICS) product available from IBM, documentation for which is included with the ICS product.

Referring to FIG. 9, in step 9000, the augmented HTTP request handler 2060 awaits requests from HTTP clients. In step 9010, the HTTP request handler 2060 processes the request until a point where it returns its response to the requester. In step 9020, if the request was not successful, then, in step 9030, the HTTP request handler 2060 returns its error notification response to the requester. If the request was successful, then control is passed to META-tag module 2070 in step 9040. Once the META-tag module 2070 returns control to HTTP request handler 2060, the response is returned to the client.

Figure 10:
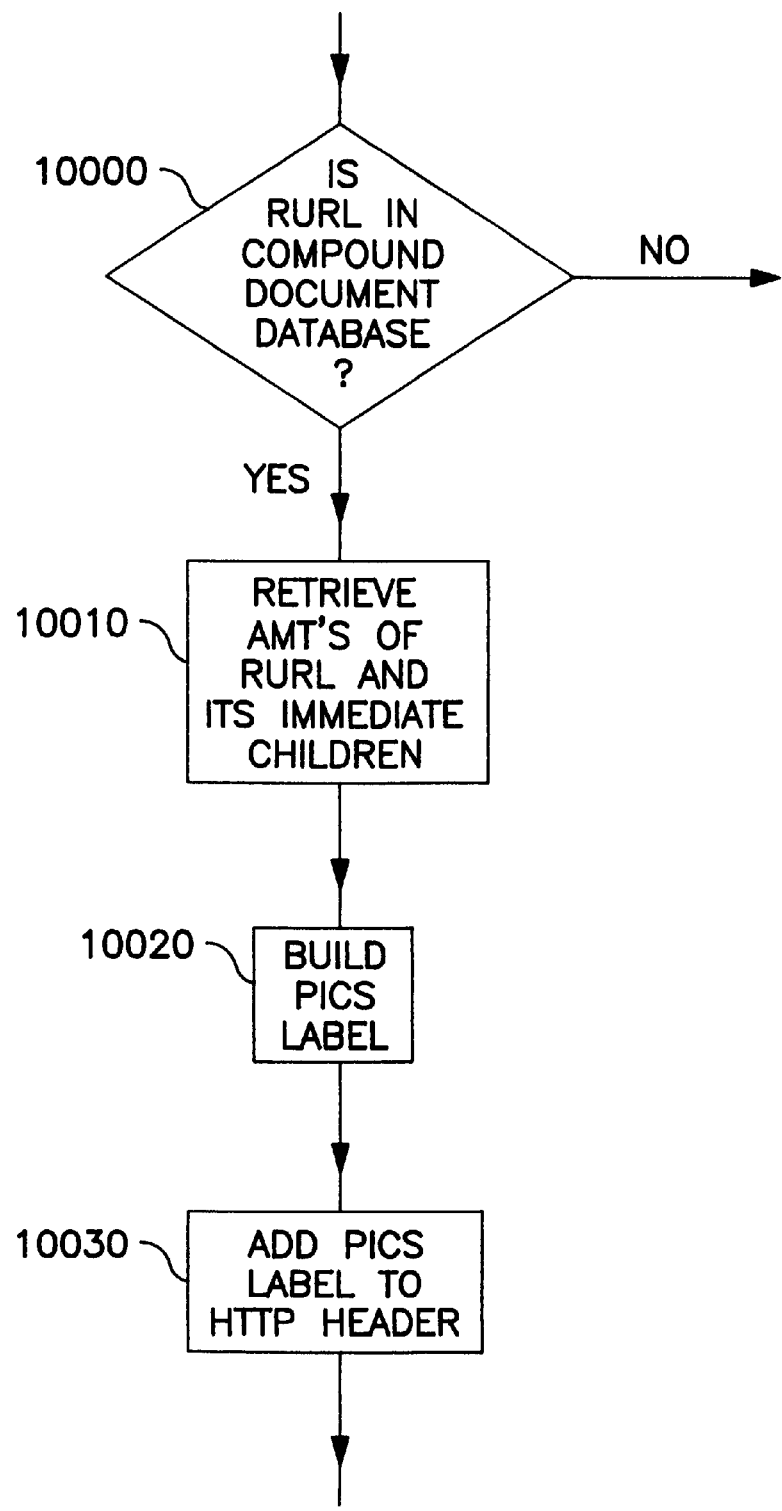
FIG. 10 depicts an example of the META-tag module's workflow.

FIG. 10 depicts an example of the workflow of the META-tag module 2070 having features of an exemplary embodiment of the present invention. In this example and in FIG. 10, RURL is the URL requested.

In step 10000, the compound document database 2080 is consulted and if there is no entry for RURL, control is returned to the HTTP request handler 2060. If RURL is in the compound document database 2080, then, in step 10010, the AMT for RURL and all of its immediate child nodes are retrieved from the compound document database 2080. In step 10020, a PICS label for all of the retrieved AMTs is constructed. In step 10030, this PICS label is added to the HTTP header of the returned response, and then control is returned to the HTTP request handler 2060. For example, if the requested URL was:

http://foo.bar/index.html whose immediate child nodes were:

http://foo.bar/news/index.html and http://foo.bar/cool_links/index.html then the resulting PICS label constructed by the META-tag module 2070 might be:

(PICS-1.1 "http://ww.gcf.org/v2.5"
  for "http://foo.bar./index.html"
  ratings (obscenity 3 technical 4 political 6)
  for "http://foo.bar/news/index.html"
  ratings (obscenity 0 technical 4 political 6)
  for "http://foo.bar/cool_links/index.html"
  ratings (obscenity 3 technical 3 political 0)

which indicates that for:

"http://foo.bar./index.html"

the PICS label category values for: obscenity=3, technical=4, and political=6; while for:

"http://foo.bar/news/index.html"

the PICS label category values for: obscenity=0, technical=4, and political=6;

and for

"http://foo.bar/cool_links/index.html"

the PICS label category values for obscenity=3, technical=3, and political=0.

Those skilled in the art will appreciate that since the PICS label is returned in the HTTP header, that clients can determine the PICS rating for a given node using only a HEAD request, thus saving the computation and network overhead of retrieving the PICS rating from either data's HTML header, or from an external PICS label bureau.

Those skilled in the art will appreciate that a client can determine whether a given web page, either a simple data resource or collection of objects, contains any relevant information for them by simply requesting the data using a "HEAD" request for header information, as specified in RFC 2068, for example. A participating server's response to such a request will include the AMT of the requested web page from which the client can determine whether or not the contents of the page are worth retrieving. For example, a client could make the HEAD request:

HEAD /sports.index.html to determine whether the server's sports related index page currently contained anything interesting. Note that this web page might change dramatically often.

The HTTP header of the server's response might contain the entry:

PICS_label:( . . . (soccer 10 tennis 1 baseball 0) . . . )

indicating that the web page's contents (including both the contents of the page itself and the contents of linked pages) contained lots of information regarding soccer, and little information regarding baseball or tennis. Given this knowledge, the client could then better decide whether to retrieve the actual page. Note that since the information was retrieved using a "HEAD" request, that only the HTTP header of the web page needed to be returned, thus saving network load, and client processing resources.

Those skilled in the art will also appreciate that since the META-tag information is communicated using the PICS protocol which adheres to the HTTP protocol, that conventional web (HTTP) clients can make requests from participating servers without modification.

The present invention also provides a method whereby the META-tagged links of a retrieved web page (if available) can be annotated to display their corresponding META-tags. This method involves the steps of: 1) using a client-side proxy to examine the META-tag of a Web page or objects and 2) displaying the associated META-tag information with each link (e.g., HTTP link) in the web page, if available.

Figure 13:
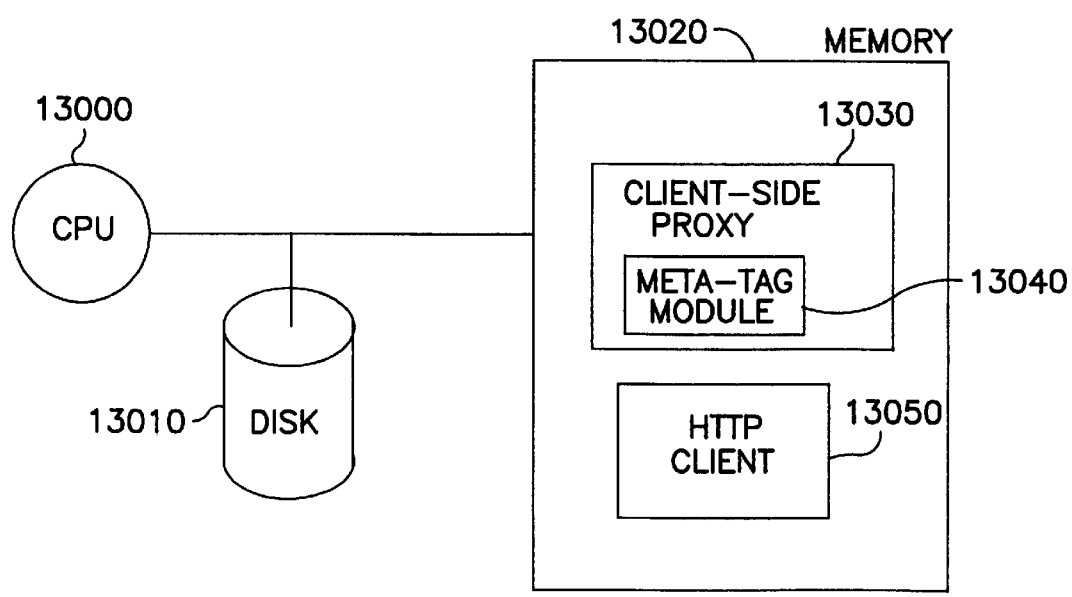
FIG. 13 depicts an example of the client of FIG. 1.

FIG. 13 depicts a more detailed example of the architecture of the client (1030 . . . 1040) of FIG. 1. As is known in the art, this client includes a CPU 13000, a disk 13010 such as a magnetic, electronic, or optical storage media for persistent data and/or program/code storage, and a memory 13020 for dynamic access and/or execution of the data and/or programs by the CPU 13000. Those skilled in the art will appreciate that within the spirit and scope of the present invention, one or more of the components located in the memory 13020. could be accessed and maintained directly via disk 13010, the network 1050, another server, or could be distributed across a plurality of servers.

Two important components of this client, preferably embodied as software executables on CPU 13000), are a client-side proxy server (13030) and a conventional web client (HTTP client) 13050. The client-side proxy server 13030 is described in more detail below with reference to FIG. 15.

The conventional web or HTTP client 13050 is a user interface which allow users to make HTTP requests using the HTTP protocol, and view the returned data; for example, see RFC 2068. However, web client 13050 makes all of its requests through a client-side proxy server 13030. For the exemplary embodiment, since use of a proxy server is defined within the HTTP protocol, no special or customized web client is required.

Figure 14:
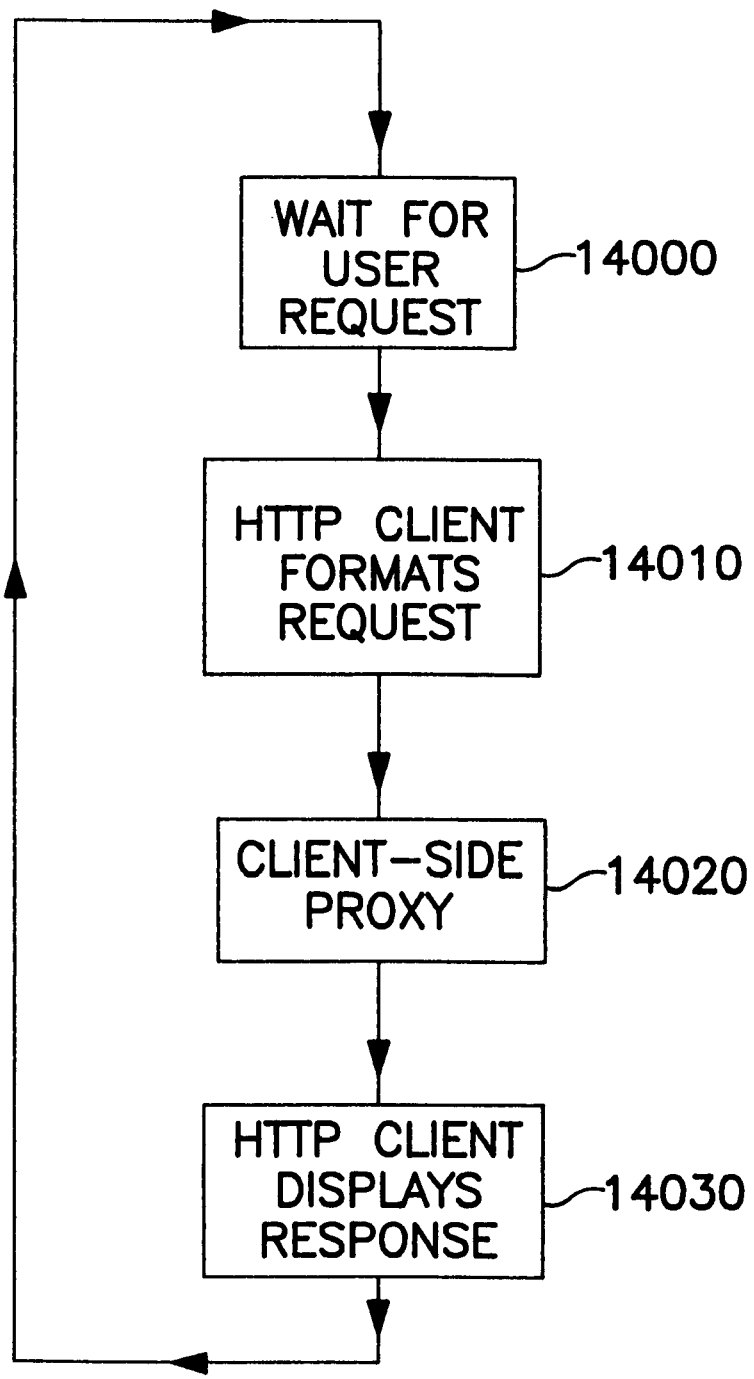
FIG. 14 depicts an example of the client logic.

FIG. 14 depicts an example of a client logic having features of the present invention. As depicted in FIG. 14, in step 14000, a web client 13050 waits for requests from the user. In step 14010, the web client 13050 formats the request and passes it to the client-side proxy 13030. In step 14020, as described with reference to FIG. 15, the client-side proxy 13030 processes the request and then returns the results to the web client 13050, which in step 14030, displays the results to the user.

Figure 15:
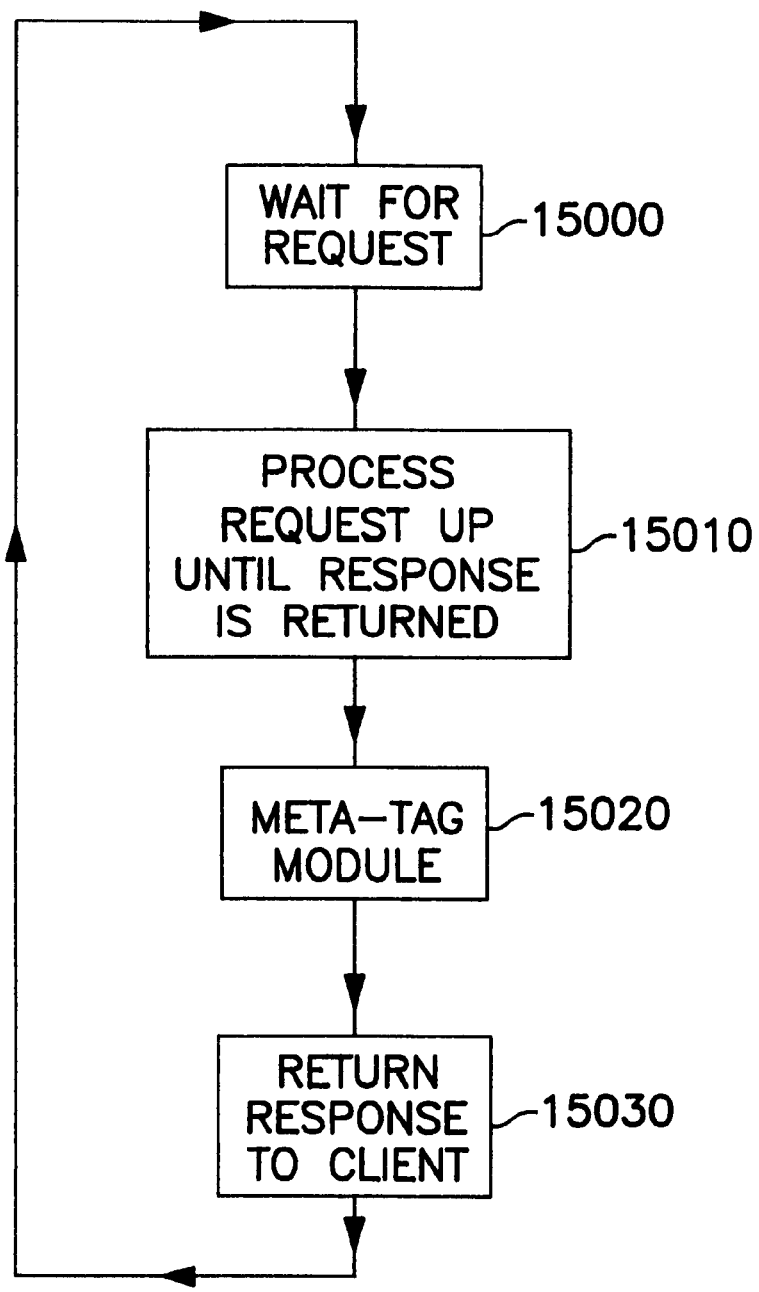
FIG. 15 depicts an example of the client-side proxy logic.

FIG. 15 depicts an example of the client-side proxy logic having features of the present invention. As depicted, in step 15000, the server awaits request from the web client. In step 15010, the client-side proxy 13030 processes the request up until the point where the response is returned to the client. In step 15020, control is handed off to the META-tag-module 13040, described with reference to FIG. 16. An HTTP proxy server's behavior may be augmented by adding modules to which control is temporarily passed. These modules are written using the proxy's application programmer's interface (API) as described previously. Once the META-tag module 13040 returns control to client-side proxy server 13030, the response is returned to the client.

Figure 16:
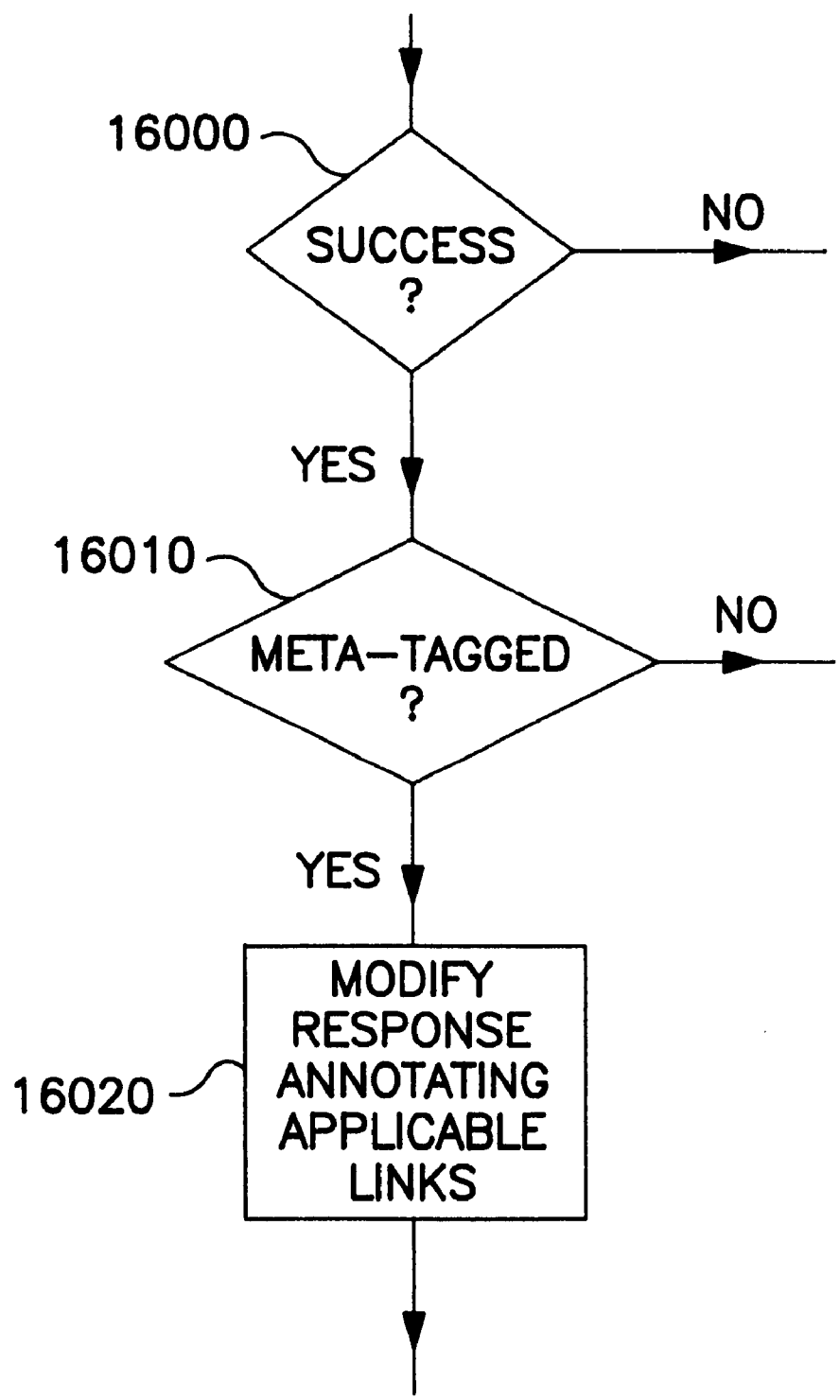
FIG. 16 depicts an example of the client-side proxy META-tag module logic.

FIG. 16 depicts an example of META-tag module logic having features of an exemplary embodiment of the present invention. As depicted, in step 16000, if the requested web page was not successfully retrieved (e.g., because the requested page could not be found on the specified server), then control is returned to the client-side proxy 13030. If the request was successful, but the retrieved web page was not META-tagged using the present invention, then control is returned to the client-side proxy 13030. If the retrieved web page was META-tagged in accordance with the present invention, then, in step 16020, all links whose AMTs are specified in the retrieved web page's META-tag, are annotated to reflect their description. Once the web page's annotation is complete, control is returned to the client-side proxy server 13030.

Figure 3:
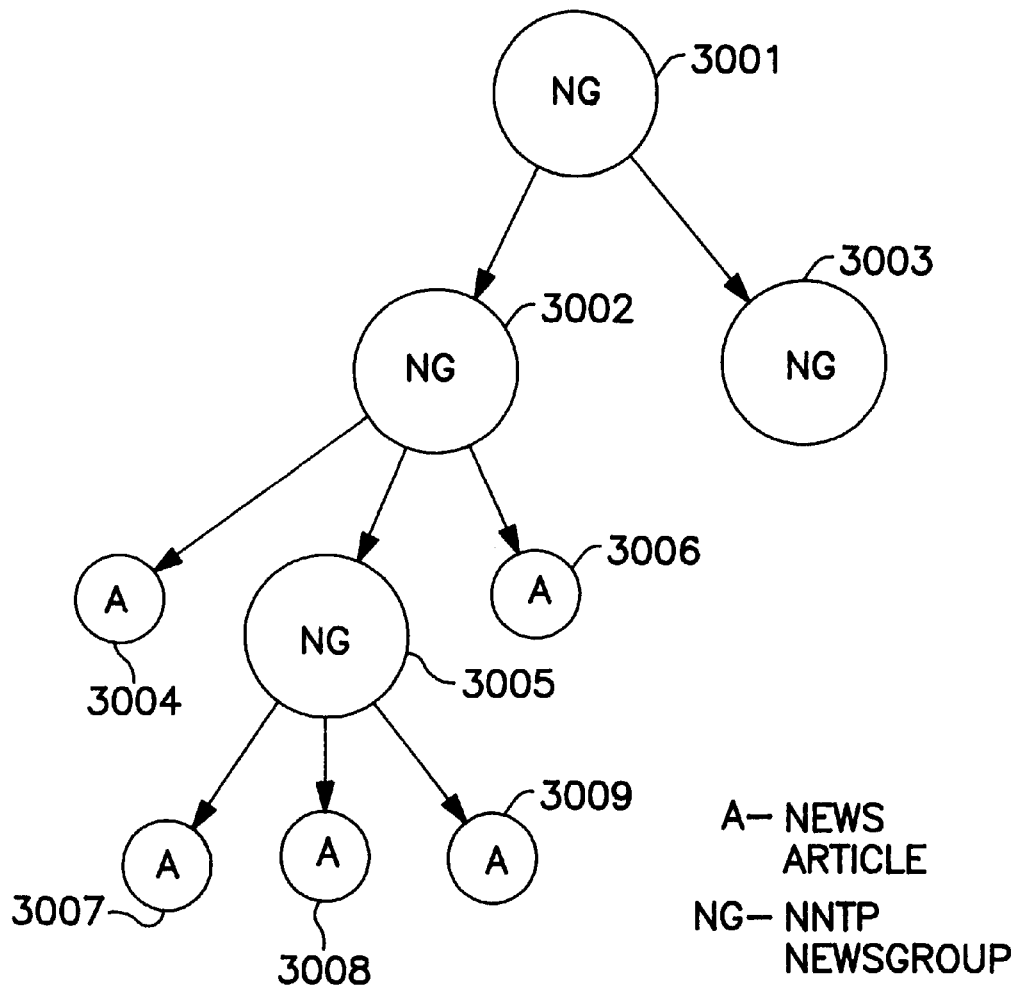
FIG. 3 illustrates an example of a strictly hierarchical compound document.

Those skilled in the art will appreciate that the present invention can also be applied to strictly hierarchical compound documents, as illustrated in FIG. 3, for example. In such case, optimizations may be made to the algorithm presented above, because the process described above never has to check for loops (i.e., cases where a given document node includes itself, either directly or recursively) to avoid processing errors.

Further, those skilled in the art will appreciate that not all document nodes need to participate in the META-tagging as provided in accordance with the current invention. If a given node is added to a given compound document without being added to the compound document database 2080 via an add request to the compound document handler 2030, then the contributions of its EMTs (external META-tags) will not be aggregated into the META-tagging provided by the current invention.

Those skilled in the art will also appreciate that access the aggregated META-tags maintained by the current invention may be limited since any given server 1020 can be customized so as not to include the calculated AMT in the HTTP header of its responses when requests are made from requesters with particular characteristics (e.g. IP address ranges, domains, or user IDs).

Those skilled in the art will appreciate that among the EMT's used in the META-tagging provided by the current invention, one may employ a PICS label added by the server itself which specified freshness and expiration information concerning the added data object. This information would be maintained and accessed just like any of the other META-tag descriptions maintained by the current invention.

Since an exemplary embodiment of the present invention employs the PICS protocol, and since the PICS protocol provides for the digital signature of PICS labels. those skilled in the art will appreciate that a server 1020 using the META-tagging enabled by the current invention may authenticate EMT's specified to it in compound documents handler requests 2030, and digitally sign all of the AMTs (or even IMTs) that it returns to requesters, enabling them to authenticate the META-tags returned to them.

Those skilled in the art will also appreciate that employing the PICS protocol a server 1020 which provides the META-tagging enabled in accordance with the current invention, may charge data sources to have their data META-tagged using the methods provided by the current invention. For example, a server 1020 may only accept compound document handler requests in the form of HTTP requests and only those that contained acceptable digital signatures, i.e., those of its customers. Given the verifiable identity of the requester, the server could then maintain a bill for each modification made.

Finally, those skilled in the art will appreciate that a search engine may use the META-tags (AMTs) maintained in accordance with the current invention to increase the efficiency of searches it performs. First, the AMT META-tag for a given data object may be retrieved without retrieving the data object's contents itself (e.g., by executing a HEAD request for the object), thus reducing the required network bandwidth and processing. Second, given the object's AMT, the search engine may determine whether to search the object further by comparing the requested characteristics to those specified by the returned AMT. Therefore, the search engine never has to analyze the data object's contents, thus, further reducing processing time.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed:

1. An apparatus for categorizing a plurality of objects which together comprise an object set, wherein a respective categorization value is associated with each object in said set, said apparatus comprising:

a request handler for modifying said categorization value of one of said objects or for one of deleting one of said objects or adding a further object to said object set;

data storage means for storing a global rating value which is calculated based on each categorization value of all of said objects in said object set;

compound means for recalculating said global rating value responsive to invocation of said request handler; and modifying means for modifying said global rating value by employing an aggregation algorithm, wherein said aggregation algorithm recursively includes each one of said plurality of objects; and wherein said modifying means includes means for identifying and tracking each object for which said categorization value is included in said global rating value such that said aggregation algorithm includes said categorization value of each object of said plurality of objects a predetermined number of times.

2. The apparatus for categorizing said plurality of objects as recited in claim 1, wherein said means for identifying and tracking each object allows said aggregation method to include once said rating of each object of said plurality of objects, thereby to avoid over-counting of categorization values when said plurality of objects exhibit a looping characteristic.

3. The apparatus for categorizing said plurality of objects as recited in claim 1, wherein said means for identifying and tracking each object allows said aggregation algorithm to record said rating of each object of said plurality of objects, thereby to avoid propagation of categorization values.

4. The apparatus for categorizing said plurality of objects as recited in claim 1, wherein said means for identifying and tracking each object further includes means for verifying a validity of each categorization value and said global rating value.

5. An apparatus for categorizing a plurality of objects which together comprise an object set, wherein a respective categorization value is associated with each object in said set, said apparatus comprising:

a request handler for modifying said categorization value of one of said objects or for one of deleting one of said objects or adding a further object to said object set;

data storage means for storing a global rating value which is calculated based on each categorization value of all of said objects in said object set; and compound means for recalculating said global rating value responsive to invocation of said request handler, wherein the plurality of objects are Web pages of an Internet environment, wherein each object in said set includes a header which is an HTTP header, said categorization value includes META-tag information, and said modifying means modifies said global rating value by inserting, deleting and updating said META-tag information in said HTTP header; and wherein said META-tag information is represented by a PICS label having said categorization value and a degree value.

6. The apparatus for categorizing a plurality of objects as recited in claim 5, wherein said PICS label further includes a time value indicating an age of said META-tag information.

7. The apparatus for categorizing a plurality of objects as recited in claim 5, wherein said PICS label further includes a digital signature, and said apparatus further comprises means for verifying said digital signature.

8. The apparatus for categorizing a plurality of objects as recited in claim 5, wherein said PICS label further includes a billing value, and said apparatus further comprises means for recording each said billing value.

9. A method of categorizing a plurality of objects which together comprise an object set; said method comprising the steps of:

a) storing a categorization value for an object in said object set, wherein the plurality of objects are Web pages of an Internet environment; and b) storing a global rating value for all objects in said object set; wherein said categorization value is stored in an HTTP header, said categorization value includes META-tag information, wherein said META-tag information is represented by a PICS label having said categorization value and a degree value, and said modifying step modifies said global rating value by inserting, deleting and updating said META-tag information in said HTTP header; and c) selectively recalculating said global rating value, said global rating value being a calculation of all categorization values in said object set, if at least one of a) said categorization value of any object in said object set is altered, b) at least one additional object is added to said object set, and c) at least one of said plurality of objects is deleted from said object set.

10. The method of categorizing a plurality of objects as recited in claim 9, wherein said PICS label further includes a time value indicating an age of said META-tag information.

11. The method of categorizing a plurality of objects as recited in claim 9, wherein said PICS label further includes a digital signature, and said method further includes the step of verifying said digital signature.

12. The method of categorizing a plurality of objects as recited in claim 9, wherein said PICS label further includes a billing value, and said method further includes the step of recording each said billing value.

13. A method of categorizing a plurality of objects which together comprise an object set; said method comprising the steps of:

a) storing a categorization value for an object in said object set;

b) storing a global rating value for all objects in said object set;

c) selectively recalculating said global rating value by employing an aggregation algorithm, said global rating value being a calculation of all categorization values in said object set, if at least one of a) said categorization value of any object in said object set is altered, b) at least one additional object is added to said object set, and c) at least one of said plurality of objects is deleted from said object set;

d) identifying each object for which said categorization value is included in said global rating value, and e) tracking each object for which said categorization value is included in said global rating value such that said aggregation algorithm includes said categorization value of each object of said plurality of objects a predetermined number of times.

14. The method of categorizing said plurality of objects as recited in claim 13, wherein said identifying and tracking steps allow said aggregation algorithm to include once said rating of each object of said plurality of objects, thereby to avoid propagation of categorization values and to avoid over-counting of categorization values when said plurality of objects exhibit a looping characteristic.

* * * * *